(12) United States Patent
Owa

(10) Patent No.: US 7,587,338 B2
(45) Date of Patent: Sep. 8, 2009

(54) COMMUNITY SERVICE OFFERING APPARATUS, COMMUNITY SERVICE OFFERING METHOD, PROGRAM STORAGE MEDIUM, AND COMMUNITY SYSTEM

(75) Inventor: Tsunayuki Owa, Kanagawa (JP)

(73) Assignee: Sony Corporation, Tokyo (JP)

( * ) Notice: Subject to any disclaimer, the term of this patent is extended or adjusted under 35 U.S.C. 154(b) by 550 days.

(21) Appl. No.: 09/961,375

(22) Filed: Sep. 25, 2001

(65) Prior Publication Data

US 2002/0040327 A1 Apr. 4, 2002

(30) Foreign Application Priority Data

Sep. 26, 2000 (JP) .............................. 2000-292828

(51) Int. Cl.
*G06Q 30/00* (2006.01)
(52) U.S. Cl. .................. 705/26; 709/204; 709/219; 709/223; 715/706; 345/473
(58) Field of Classification Search .................. 705/44; 709/204
See application file for complete search history.

(56) References Cited

U.S. PATENT DOCUMENTS

| | | | | |
|---|---|---|---|---|
| 5,889,951 A | * | 3/1999 | Lombardi .................. | 709/219 |
| 5,983,003 A | * | 11/1999 | Lection et al. ............... | 709/202 |
| 6,009,460 A | * | 12/1999 | Ohno et al. .................. | 709/204 |
| 6,057,856 A | * | 5/2000 | Miyashita et al. ........... | 345/633 |
| 6,219,045 B1 | * | 4/2001 | Leahy et al. ................. | 345/757 |
| 6,401,122 B1 | * | 6/2002 | Matsui et al. ............... | 709/227 |
| 6,404,430 B1 | * | 6/2002 | Kawamura et al. .......... | 345/427 |
| 6,421,047 B1 | * | 7/2002 | de Groot ...................... | 345/419 |
| 6,446,200 B1 | * | 9/2002 | Ball et al. ....................... | 713/1 |
| 6,577,328 B2 | * | 6/2003 | Matsuda et al. .............. | 345/757 |
| 6,782,369 B1 | * | 8/2004 | Carrott ........................... | 705/1 |
| 2005/0004983 A1 | * | 1/2005 | Boyd ........................ | 709/204 |

FOREIGN PATENT DOCUMENTS

EP 0920178 * 6/1999
WO WO 9607151 * 3/1996

OTHER PUBLICATIONS

Create 3D Virtual Identities, Business Wire, Nov. 1999.*
Build yourWeb in 3D, Communicationsweek, n647, p. 50, Jan. 1997.*

* cited by examiner

*Primary Examiner*—F. Zeender
*Assistant Examiner*—Luna Champagne
(74) *Attorney, Agent, or Firm*—Oblon, Spivak, McClelland, Maier & Neustadt, P.C.

(57) ABSTRACT

A community system is disclosed which allows community service offering apparatus to exchange information with a plurality of user terminals connected by a network. The community service offering apparatus includes: a virtual space information storing element for storing in advance information about a plurality of virtual spaces; a virtual space offering element for allowing a user to select any one of the virtual spaces and for offering the selected virtual space as a user-specific virtual space owned by the user regarded as a privileged user; and a charge controlling element for charging the privileged user who owns the user-specific virtual space a fee corresponding to a type of the user-specific virtual space, while not charging fees on those users other than the privileged user who simply gain access to the user-specific virtual space of the privileged user.

16 Claims, 21 Drawing Sheets

FIG.6

| SERVER NO. | ROOM NO. | OWNER ID | TYPE | NAME | WATCH-WORD | |
|---|---|---|---|---|---|---|
| | | | | | | |
| | | | | | | |
| | | | | | | |
| | | | | | | |
| | | | | | | |

FIG.7

| TYPE | MONTHLY FEE |
|---|---|
| HIGH CLASS | 2000 |
| MEDIUM CLASS | 1500 |
| ORDINARY CLASS | 1000 |

FIG.12

| | | MONTHLY FEE | DESCRIPTION (FUNCTIONAL) | GALLERY DESIGN |
|---|---|---|---|---|
| HIGH-CLASS ROOM ◉ | 🔑 | ¥2,000 | ACCOMMODATES UP TO 50 PEOPLE AND A MAXIMUM OF 50 ITEMS OVER AN AREA OF 400 m² | • CASTLE • MUSEUM • ANCIENT RUINS |
| MEDIUM-CLASS ROOM ○ | 🔑 | ¥1,500 | ACCOMMODATES UP TO 30 PEOPLE AND A MAXIMUM OF 30 ITEMS OVER AN AREA OF 200 m² | • RESIDENCE • CHURCH • TERRACED HOUSE |
| ORDINARY-CLASS ROOM ○ | 🔑 | ¥1,000 | ACCOMMODATES UP TO 10 PEOPLE AND A MAXIMUM OF 20 ITEMS OVER AN AREA OF 100 m² | • DETACHED HOUSE • BATHHOUSE |

Buy a Room — SELECT THE TYPE OF ROOM THAT WILL SUIT YOUR FANCY

[BUY]

FIG. 23

| SERVER NO. | ROOM NO. | FRAME NO. | NAME | TYPE | URL | ITEM ID | LOCATION | SCALE | ROTATION |
|---|---|---|---|---|---|---|---|---|---|
| | | | | | | | | | |
| | | | | | | | | | |
| | | | | | | | | | |
| | | | | | | | | | |

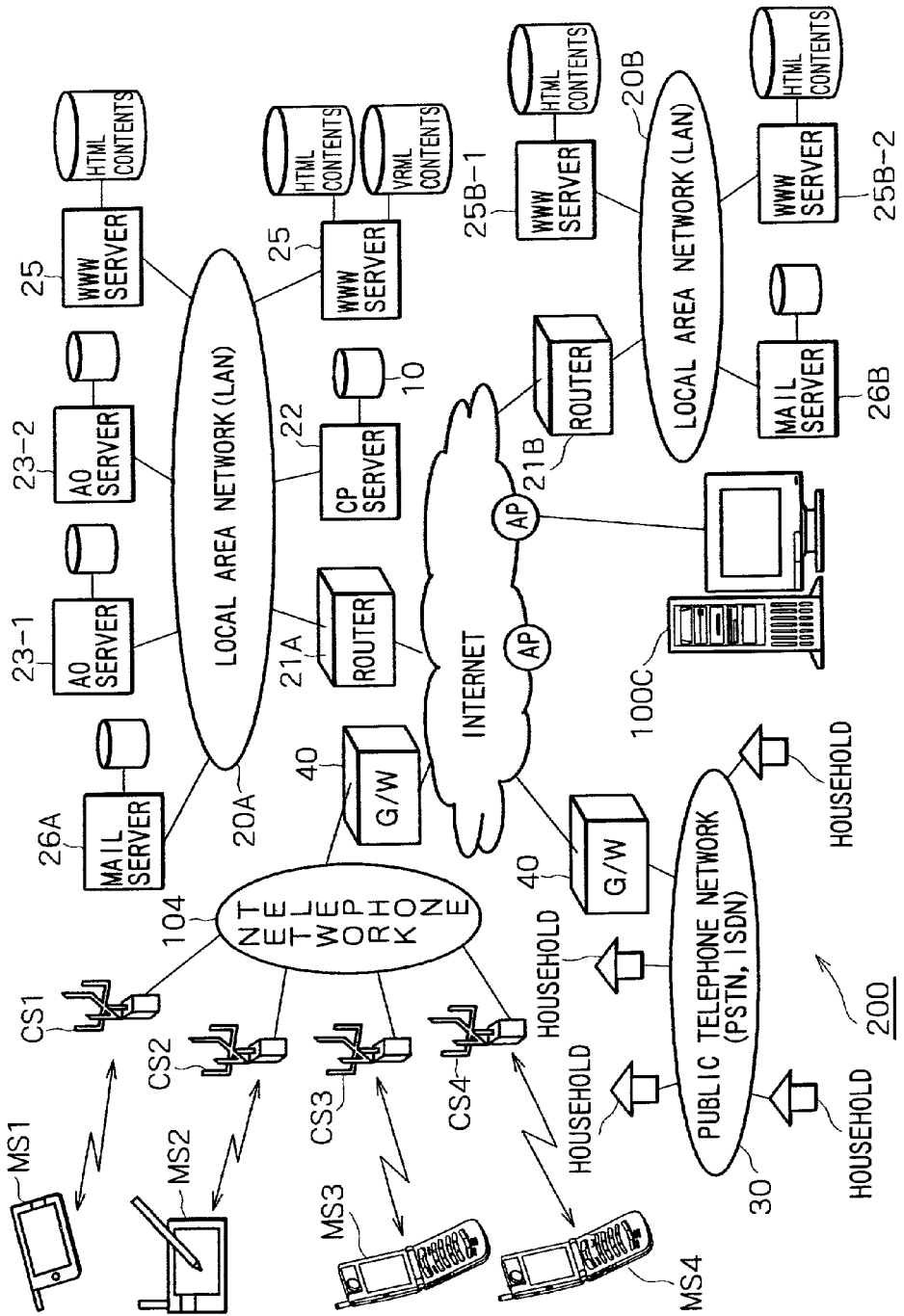

COMMUNITY SERVICE OFFERING APPARATUS, COMMUNITY SERVICE OFFERING METHOD, PROGRAM STORAGE MEDIUM, AND COMMUNITY SYSTEM

BACKGROUND OF THE INVENTION

The present invention relates to a community service offering apparatus, a community service offering method, a program storage medium, and a community system. More particularly, the invention relates to techniques for automatically charging users for services established and offered over a computer network such as the Internet.

Recent years have witnessed phenomenal advances in computing technology spanning information processing and data communication resulting in widespread acceptance of computer systems in society. The trend has given rise to a growing need for network-based computing techniques designed to interconnect computers. The network allows users of connected computers to share computer-related resources and to distribute, deliver, exchange or share diverse kinds of information therebetween. Furthermore, the users of network-linked computers may jointly perform tasks over the network.

There exist various types of networks for interconnecting computers. Such networks include a LAN (local area network) established locally by use of, say, the Ethernet (trademark); a WAN (wide area network) constituted by interconnecting LANs using dedicated lines; and the Internet, a network on a global scale built up by increasing numbers of networks getting connected with one another throughout the world.

Many services are offered on the Internet, including the WWW (World Wide Web), News, TELNET (TELetypewriter NETwork), FTP (File Transfer Protocol), and Gopher. Of these services, the WWW is a global information search system offering information spaces of a hyperlinked structure, which is the biggest contributing factor to the explosive growth and rapid acceptance of the Internet.

In addition to the services outlined above, applications such as BBS (bulletin board system, i.e., an electronic bulletin board on which to post notices) and the so-called chat are offered on the Internet.

BBS is a system that allows computerized information to be posted cumulatively at servers on a network so that the posted information may be browsed via the network. The BBS system manages information in a unified manner using servers and offers the advantage of permitting users dispersed over wide areas to exchange information in real time.

The chat is an online talk service allowing users to "talk" with one another over the network by typing characters using keyboards. A plurality of users log in to a "chat room" for simultaneous conversation, with each user's statement displayed concurrently on the monitor screens of all the participants. The chat system allows users residing in wide areas to enjoy real-time talks or debates in a virtual world built on the Internet. In other words, the chat system provides a community established virtually over the Internet. That community is created and maintained by a plurality of users who log in to the service and perform simulated social activities constituted by communications.

What is appealing about the chat is that as soon as a user logs in to the virtual world offered by the chat system, he or she is entitled immediately to take part in the ongoing discussion. Also appealing is the fact that participants need not know one another in the real world. Whereas interactions by BBS may be termed asynchronous, talks through the chat system are synchronous so that each participant can evaluate the others' reactions before proceeding with more contributions to the conversation. This feature provides a more stimulating communication environment.

An example of the chat is known as "Habitat" (trademark) in the field of personal computer communication services. Habitat constitutes a service that permits chat in the so-called cyberspace.

In a Habitat environment, users launch their "avatars" (originally the incarnations of Hindu deities) into a virtual city called Populopolis rendered in two-dimensional graphics. In Populopolis, users who have logged on can chat with one another through their avatars. Details of Habitat are described illustratively in "Cyberspace: First Steps" (by Michael Benedikt; ed. 1991, MIT Press; Cambridge, Mass.; ISBN0-262-02327-X).

Some resource services offered on a wide area network such as the Internet have been rendered chargeable. In such cases, users of the services are charged on a fixed-price basis (monthly) or on an as-used basis.

At chargeable or members-only sites, users trying to log in to the server (or to gain access to chargeable resources) are prompted to enter the user's name (or account name or login name) and a password. The login procedure involves a dialog box popping up on the user's browser screen urging the user to input his or her name and a password. With the user's name and password entered, the server authenticates the user's qualifications and determines whether or not to grant permission to log on. Fees are settled in diverse ways: by credit card or debit card; by withdrawals from the user's account at designated financial institutions such as banks; or by mailing of an invoice to the user for subsequent settlement.

On the side of service providers that operate servers, the fees collected from users sustain the offered services or are used as funds for research and development of future products. In that sense, the practice of rendering services chargeable is rightfully in line with the spirit of the market economy.

From the user's viewpoint, however, chargeable services are often regarded as significant economic or mental burdens or barriers to the continuous use of the services. Such barriers are not necessarily overcome simply because service providers develop and offer more attractive products or services to potential users. Sometimes, rendering a hitherto-free service chargeable can drastically reduce the number of its users.

Drops in the number of users translate into proportionally depressed sales for, say, simple information providing services over the network or for network-based marketing services designed to bypass some product distribution stages to cut down on expenses.

The diminishing number of users can be a far more serious problem with community type services such as the chat system. The reason is that a community can be created and maintained only if a plurality of users participate in it (i.e., log on to it) and conduct simulated social activities (communications). With few other users (talking partners) in the community space, the community itself will disappear as the basis of the service. The situation is the same with game communities: games requiring opponents (role-playing, action, etc.) cannot be played without opponents, i.e., other users who have logged in.

In other words, running on a chargeable basis any community type service established with numerous participants is a difficult task; it challenges the meaning and the reason for such a service to exist.

There already exists a service known as rent-a-disc offered by server operators. Fees of this service are determined by physical units such as those of disc capacity (MB, GB, etc.)

that are made available to users. To understand the value of such a service, however, requires that users possess sufficient knowledge about computers and networks; novices may have difficulty understanding why such a service has marketing values. Providers of the service, for their part, have difficulty competing with one another in terms of service quality because the rent-a-disc service ultimately comes down to the simple maintenance of user's data.

SUMMARY OF THE INVENTION

It is therefore an object of the present invention to overcome the above and other deficiencies of the related art and to provide improved techniques for automatically charging users in an appropriate manner for services created and offered over a computer network such as the Internet.

It is another object of the present invention to provide improved techniques for automatically charging users in a suitable manner for community type services including a chat system and a virtual conference system established on a computer network such as the Internet by the participation of a plurality of users who log on.

In carrying out the invention and according to one aspect thereof, there is provided a community system for allowing a community service offering apparatus to exchange information with a plurality of user terminals connected by a network, the community service offering apparatus comprising: a virtual space information storing element for storing in advance information about a plurality of virtual spaces; a virtual space offering element for allowing a user to select any one of the virtual spaces and for offering the selected virtual space as a user-specific virtual space owned by the user regarded as a privileged user; and a charge controlling element for charging the privileged user who owns the user-specific virtual space a fee corresponding to a type of the user-specific virtual space, while not charging fees to those users other than the privileged user who simply gain access to the user-specific virtual space of the privileged user.

In the inventive community system above, users who simply log on to the system are not charged; only those who own user-specific virtual spaces are charged as privileged users. The system can attract a large number of users who may or may not be charged depending on the type of their preferred activities in the community. The community is sustained structurally by the numerous users—paying and nonpaying—and financially by the fees collected from the paying users for their privileged use of the system. The point is that users who do not own user-specific virtual spaces and who simply gain access, and do nothing else, to the community system are not charged. A chargeable community system can then retain a substantial number of nonpaying participants who, in addition to the paying users, will not hesitate to take part in the community despite the optionally chargeable nature of the system. This makes it possible for a community type service to survive even when the service is rendered partially payable.

Other objects, features and advantages of the invention will become more apparent upon a reading of the following description and appended drawings.

BRIEF DESCRIPTION OF THE DRAWINGS

FIG. 6 is a schematic view of a room information management table;

FIG. 7 is a schematic view of a charge information table;

FIG. 12 is a schematic view of a screen for allowing a room type to be selected;

FIG. 23 is a tabular view illustrating a structure of an item management database; and FIG. 24 is a schematic view indicating a configuration of a network computing system practiced as a variation of this invention.

DETAILED DESCRIPTION OF THE PREFERRED EMBODIMENTS

Preferred embodiments of this invention will now be described with reference to the accompanying drawings. Although the description below will contain many specificities, these should not be construed as limiting the scope of the invention but as merely providing illustrations of some of the presently preferred embodiments of this invention. It is evident that many alternatives, modifications and variations will become apparent to those skilled in the art in light of the ensuing description. Accordingly, the scope of the invention should be determined by the appended claims and their legal equivalents, rather than by the examples to be given.

First to be described below is a community system arranged to implement charge management according to this invention. Details of the charge management will then be discussed.

1. Community System

1-1. Configuration of the Community System

Figure 1:
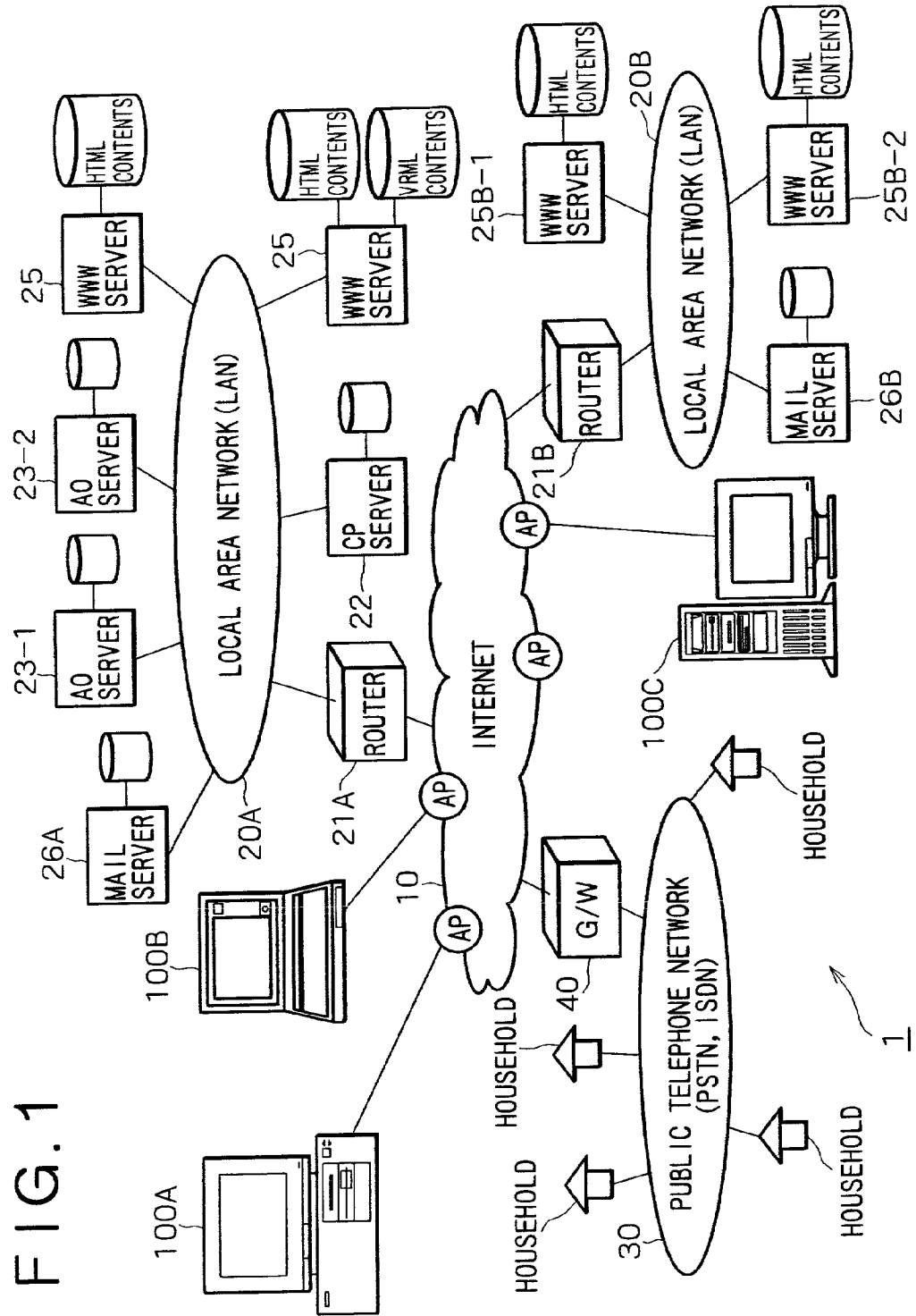
FIG. 1 is a schematic block diagram showing a configuration of a network computing system adapted to create and offer a shared virtual space environment according to the invention.

FIG. 1 shows schematically a configuration of a network computing system 1 designed to create and offer a shared virtual space environment according to the invention.

The network computing system 1 may illustratively be composed of a distributed network. In a distributed network environment, there is no need for any user to identify specific locations of resource objects such as programs and data. Procedures and methods that are executed on computers are retained and managed in a distributed manner over the network. This feature enables a process running on a networked computer to invoke and execute another process operating on another computer over the network.

As will be described later, a community system is created and offered in three-dimensional shared virtual spaces by the network computing system 1. This community system is made up of three major elements: a Community Place (trademark) browser (CP browser) for allowing users to display virtual spaces and navigate therethrough; a Community Place server (CP server) for managing shared virtual spaces; and application objects (AOs) for controlling the operation of shared applications.

The network computing system 1 is connected to countless computer systems that are dispersed throughout the world. Some computers in these systems operate as servers that offer various resource services for a fee or free of charge. Some other computers function as clients that request resource services from the servers.

As shown in FIG. 1, the network computing system 1 comprises as communication media the Internet 10, LANs (local area networks) 20A, 20B, etc., and public telephone networks 30 established and offered by telephone companies throughout the world. The LANs 20A, 20B, etc., may each be a single network segment or a plurality of segments connected by routers.

The Internet 10 and the LANs 20A, 20B, etc., are interconnected by routers 21A, 21B, etc. The Internet 10 is a colossal global network that has taken shape as a result of more and more servers of the of LANs 20A, 20B, etc., getting connected with one another over the years (as mentioned earlier). The servers on the Internet 10 and the LANs 20A, 20B, etc., can gain access to one another in compliance with predetermined communication protocols such as TCP/IP (Transmission Control Protocol/Internet Protocol).

Networks such as the Internet 10 and the LANs 20A, 20B, etc., are connected to the public telephone networks 30 via a gateway system 40. The networks 30 include PSTN (Public Switched Telephone Network) and ISDN (Integrated Service Digital Network), among others.

The public telephone networks 30 comprise innumerable exchanges and terminal stations (not shown) connected to telephone sets in general households. The public telephone networks 30 may be supplemented with a large number of wireless telephone networks (not shown) constructed by numerous common carriers offering wireless communication services. These carriers include portable telephone service providers, PHS (Personal Handyphone System) service providers, and pager service providers.

Computer systems on the Internet 10 (including computers connected to the Internet via LAN) possess IP addresses identifiable on the Internet 10. In other words, IP addresses constitute logical points of connection between the computers and the Internet 10.

On the Internet 10, there exist so-called Internet service providers (ISP) offering connection services to general users who cannot afford dedicated lines for IP connection to the Internet 10. For-profit Internet service providers are required to register with regulatory authorities as specifically categorized common carriers. General users, on the other hand, are freed from the financial burden of having to acquire a dedicated IP address each; in order to access the Internet, they need only dial up access points (AP) set up by Internet service providers (for dial-up IP connections).

Users' computers (PC) 100 may be connected through Internet service providers (i.e., via IP connection) to the Internet 10. On the Internet, such computers operate primarily as clients asking services from WWW (World Wide Web) servers and other servers.

In addition to the dial-up IP connection, Internet service providers generally offer diverse applications such as chat, BBS (electronic bulletin board system) and e-mail.

Naturally, entities other than the Internet service providers may also offer Internet-based applications including chat, BBS and e-mail.

In the example of FIG. 1, it is assumed that the Internet service provider running the LAN 20A offers a community system (i.e., chat service) according to the invention. The community system constitutes a virtual community built on the network. Users who log on to this community may enjoy chat and other simulated communications through their avatars.

The chat is a service that provides communication between remotely located users over the Internet 10. A 3D chat system of this invention is a service that offers an environment allowing users to send their avatars, i.e., their three-dimensionally incarnated alter egos, into shared 3D virtual spaces created using 3D graphics for real-time communication. Such shared 3D virtual spaces constituting the community system on the WWW may be described illustratively in VRML (Virtual Reality Modeling Language) 97 (see note 1) established as standard under ISO (International Organization for Standardization). Motions in the community system may be described using Java. Users may display on their monitor screens the shared 3D virtual spaces and navigate therethrough using a VRML browser. (Note 1: http://www.vrml.org/Specifications/VRML97/)

The LAN 20A is connected to a CP (Community Place) server 22 and at least one application object (AO) server 23-1, 23-2, etc. The CP server 22 establishes shared virtual spaces over the Internet 10 and manages the spaces by offering an environment permitting execution of various social activities therein.

The LAN 20A may comprise at least one WWW server 25 and a plurality of mail servers 26. The WWW server 25 offers HTTP (Hyper Text Transfer Protocol) resource objects including HTML (Hyper Text Markup Language) contents. The mail servers 26 provide e-mail exchange services regarding users' accounts. The servers 22, 23-1, 23-2, 25 and 26 may each gain access to the Internet 10 via the router 21A.

With this embodiment of the invention, it is assumed that the WWW server 25 offers VRML files describing 3D virtual spaces in addition to ordinary HTML contents. The VRML files include descriptions of the virtual spaces and of shared applications, and addresses (uniform resource locations or URL) in the CP server 22 or links for referring to these addresses.

The computer (PC) 100 of each user who logs on to the shared 3D virtual spaces of this embodiment has two browsers: an HTML browser for browsing through the HTML contents provided by the WWW server 25, and a VRML browser capable of handling VRML files. The VRML browser used by this embodiment will be called the CP browser hereunder because it displays the shared virtual spaces (Community Place or CP) and allows the user to browse therethrough. The HTML browser and CP browser may function on a single platform provided illustratively by Windows 95/98/NT, i.e., operating systems offered by Microsoft Corporation of the United States.

Objects may be laid out in the shared 3D virtual spaces that are created using VRML. These objects work in an apparently autonomous manner in response to user-triggered events or so-called timer events that occur over time as scheduled in advance. Acting as they do, the objects are said to manifest their "behavior."

The mechanisms of such behavior are implemented by three cooperatively structured component activities: sensing, routing, and scripting.

(1) Sensing is carried out with sensor nodes that are associated beforehand with nodes such as objects laid out in 3D virtual spaces and are described as VRML files. The sensor nodes contain fields whose changes are detected and used as a basis for sensing external events that are allowed to take place in VRML scenes.
(2) Any event that has taken place is routed as described in VRML files to an external script, i.e., a program that defines the applicable object's behavior.
(3) The external script has previously described methods that are invoked when the corresponding events occur. Upon receipt of an event routed as indicated above, the external script executes a process based on the applicable method. Thereafter, the external script changes field values in the applicable sensor node in the VRML scene based both on the result of the executed process and on the description of the routing.

The sensor nodes defined in VRML include: "TouchSensor," a sensor node that generates an event when a mouse cursor hovers over a specific object or when a user clicks on it; "ProximitySensor," a sensor node that produces an event when a user's viewpoint has entered a specific region; and "TimerSensor," a sensor node triggering an event when a predetermined time is reached or whenever a predetermined time interval has elapsed.

In FIG. 1, host terminals called servers or clients are usually implemented each by running a server application or a client application on a computer system called a workstation or a personal computer.

A hardware structure of such a computer system 500 will now be described by referring to FIG. 2. A processor 511 working as a main controller of the system 500 is called a CPU (central processing unit) and constituted illustratively by an LSI (large scale integration) chip. Under control of an operating system (OS), the CPU executes various application programs. The OS should preferably provide a GUI (graphical user interface) environment. Operating systems possessing such capabilities include UNIX (trademark), and Windows 98/NT (trademark) offered by Microsoft Corporation of the United States.

Figure 2:
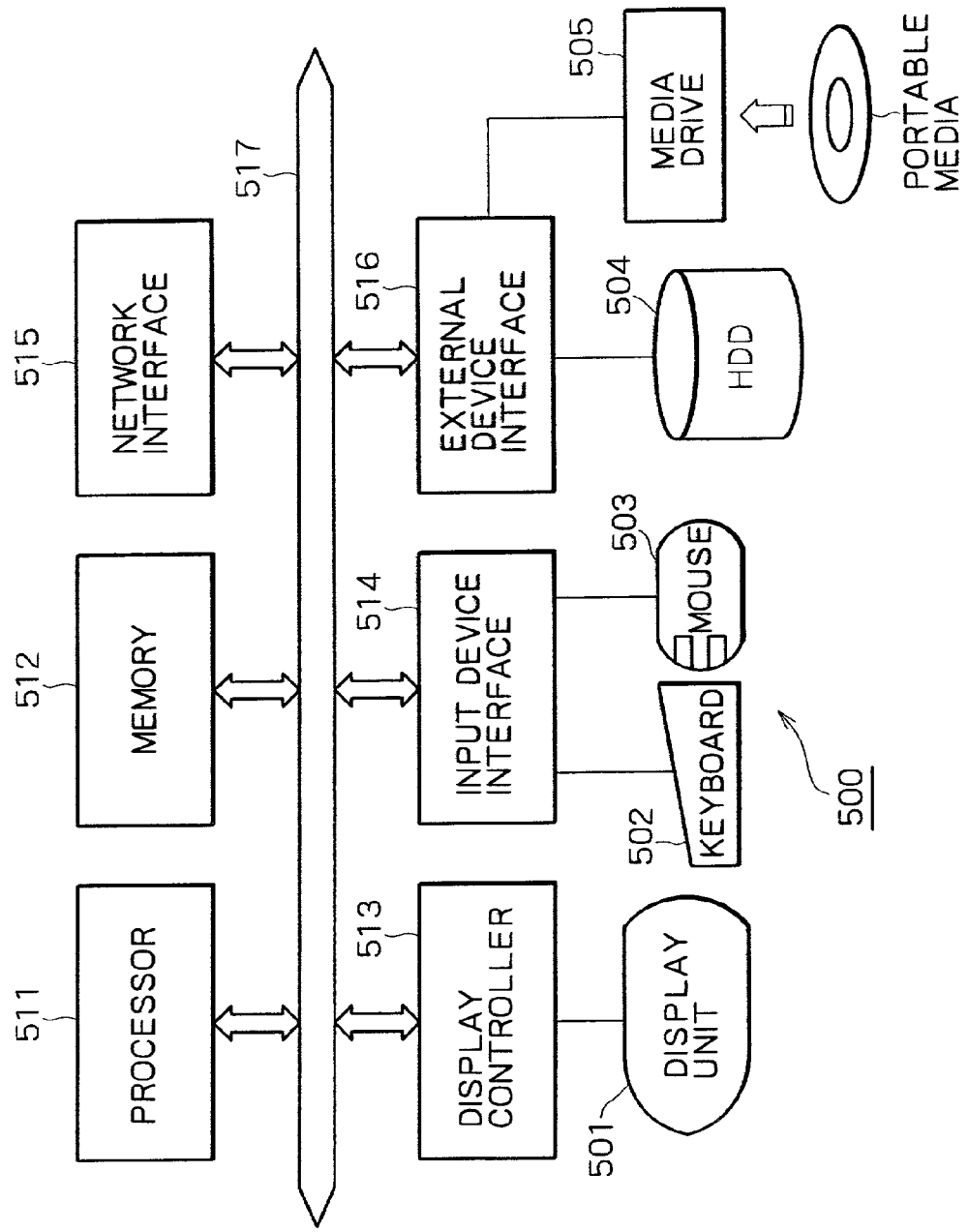
FIG. 2 is a schematic block diagram showing a hardware structure of a computer system operating as a server or a client.

As shown in FIG. 2, the processor 511 is connected to other devices (to be described later) via a bus 517. The devices attached to the bus 517 are each assigned a specific memory address or I/O address. These addresses allow the processor 511 to gain access to the corresponding devices. The bus 517 may illustratively be a PCI (Peripheral Component Interconnect) bus.

A memory 512 is a storage device that stores program codes to be executed by the processor 511 or temporarily accommodates work data during program execution. The memory 512 shown in FIG. 2 may be either volatile or nonvolatile in nature.

A display controller 513 is dedicated to actually dealing with rendering instructions issued by the processor 511. The display controller 513 supports a bit-map rendering function equivalent to SVGA (Super Video Graphic Array) or XGA (extended Graphic Array). After their processing by the display controller 513, rendering data are written temporarily to a frame buffer (not shown) before being output onto a display unit 501. The display unit 501 may illustratively be a CRT (cathode ray tube) display or an LCD (liquid crystal display).

An input device interface 514 is used to connect user input devices such as a keyboard 502 and a mouse 503 to the system 500. In response to key entries through the keyboard 502 or to a coordinate input command from the mouse 503, the input device interface 514 generates an interruption with regard to the processor 511.

A network interface 515 enables the system 500 to connect to a LAN or other network in compliance with suitable communication protocols such as the Ethernet. Generally the network interface 515 is provided in the form of a LAN adapter card that is inserted into a PCI bus slot on the motherboard (not shown). Instead of resorting to the network interface 515, the system 500 may utilize a modem (not shown) when connecting to an external network.

A plurality of hosts (i.e., host computers) are connected to the LAN in a transparent manner so as to constitute a distributed computing environment. Part of the hosts function as routers ensuring connection with external networks such as other LANs or the Internet. As is well known, software programs and data contents are distributed over the Internet.

An external device interface 516 is designed to connect external devices such as a hard disc drive (HDD) 504 and a media drive 505 to the system 500. Illustratively, the external device interface 516 complies with such interface standards as IDE (Integrated Drive Electronics) and SCSI (Small Computer System Interface).

The HDD 504 is a well-known external storage device that has a magnetic disc mounted therein as a storage medium. The HDD is superior to other external storage devices in terms of storage capacity and data transfer rate. Loading software programs onto the HDD 504 constitutes what is known as "installing" of the programs into the system. Usually, the HDD 504 contains in a nonvolatile manner program codes of the operating system, application programs, and device drivers to be executed by the processor 511.

The media drive 505 is loaded with such portable media as a CD (Compact Disc), MO (magneto-optical disc) or DVD (digital versatile disc); the drive 505 accesses the data-recording surface of the loaded disc for data manipulation. Such portable media are used primarily to back up software programs and data files as computer-readable data or to move such data between systems (for marketing, distributing and disseminating purposes).

Illustratively, the computer system 500 is any one of computing machines compatible with the PC/AT (Personal Computer/Advanced Technology) marketed by IBM Corporation of the United States, or any one of their successors.

1-2. Motion Architecture of the Community System

Figure 3:
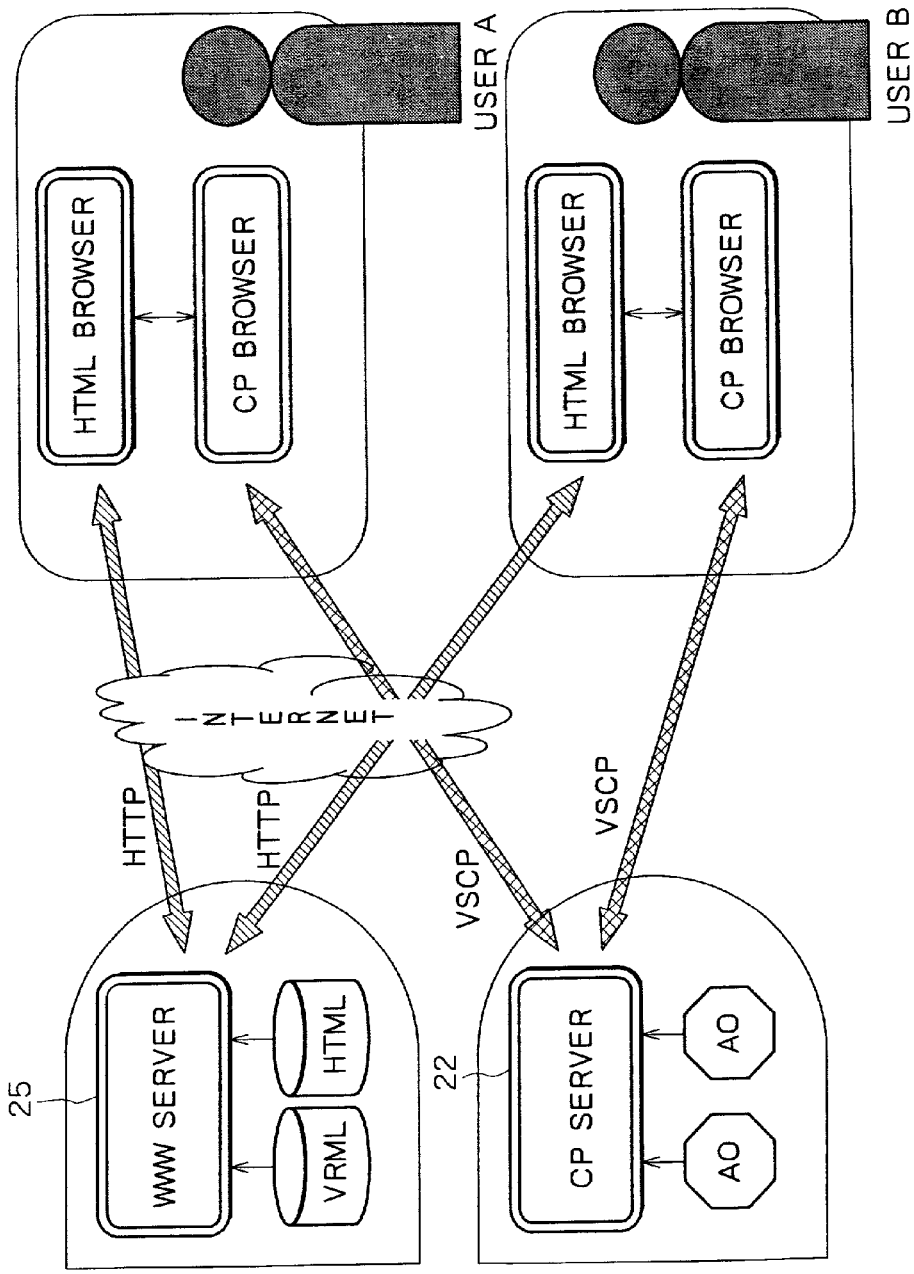
FIG. 3 is a schematic view of a motion architecture, showing how users logging on to shared virtual spaces of the invention typically navigate through such spaces.

FIG. 3 is a schematic view of a motion architecture, showing how users logging on to shared virtual spaces of the invention typically navigate through such spaces on their computers 100. As discussed above, each of the computers 100 for users A and B in FIG. 3 has two browsers: the HTML browser, and the CP browser capable of interpreting VRML contents. The HTML browser may illustratively be "Netscape Navigator" from Netscape Communications Corporation or "Internet Explorer" from Microsoft Corporation, both of the United states.

The user PC 100 is connected to the Internet 10 through a dial-up IP connection to the nearest access point (AP) of an ISP or through other suitable intervening procedures. Using its HTML browser, the user PC 100 gains access to the WWW server 25 in accordance with the HTTP protocol. After obtaining a VRML file describing a shared virtual space from the WWW server 25, the user PC 100 transfers the file to the CP browser.

The CP browser analyzes the received VRML file and gives a display correspondingly on a browser screen. If an address of a CP server 22 is designated in the VRML file, the CP browser attempts to access the CP server 22 at the designated address. The CP browsers having acquired the same VRML file thus connect to the same CP server 22 (i.e., log on to it). This allows the users operating the CP browsers to share VRML scenes (i.e., the same 3D virtual space) described in the VRML file.

After a successful connection to the CP server 22 (i.e., log-on to shared virtual spaces), communications between the CP server 22 and the CP browser are carried out in keeping with a predetermined server-client protocol (e.g., VSCP (Virtual Society Server-Client Protocol; see note 2) in this specification). The VSCP protocol or its equivalent is assumed to include a function for reporting to the CP server 22 any changes that users may have made through their CP browsers (e.g., acquisition or discarding of items by users' avatars), and a function for relaying the reported changes from the CP server 22 to the other CP browsers. (Note 2: Honda, Y., Matsuda, K., Rekimoto, J., and Lea, R. "Virtual Society," Proc. of VRML '95, San Diego, U.S.A., ACM press, pp. 109-116, 1995)

The CP server 22 is capable of restricting the delivery of information that each CP browser needs to know (i.e., information to be sent to CP browsers) by use of what is known as an aura algorithm (see note 3). The aura signifies surrounding regions of an avatar, i.e., regions that are deemed to attract each user's attention. The algorithm works in such a manner that anything outside the avatar's aura is considered uninteresting to the user in question and thus no information about the surroundings is sent to that user. The algorithm thus restricts the amount of information to be delivered to each user, whereby network traffic to each login user is kept from exceeding a predetermined level. (Note 3: Beford, S., and Fahlen, L., "A spacial model of interaction in large virtual environments," Proc. of G. DeMichelis et al. (Eds.), Third European Conference on Computer Supported Cooperative Work, Kluwer Academic Publishers, pp. 109-124, 1993)

In a shared virtual space offered by the CP server 22, there can be various objects such as avatars (users' incarnated alter egos) and pets (virtual animals) kept by avatars. These objects and their motions as well as other applications in the virtual space are shared by users who are present in the same space (i.e., who have logged on to the space), and are thus called shared applications in this specification.

Application objects (AO) on the AO server 23 manage the shared applications. The development environment for application objects is constituted primarily by Java or C++. The application objects provide access to information inside the CP server 22, offer event handlers such as timers, and provide API (application programming interface) for controlling shared objects under management of the application objects. The shared objects in this context are objects that appear (for sharing purposes) on the browser screen of each user's PC. The objects include avatars as users' incarnated alter egos, virtual animals (pets) kept by avatars, rooms owned by avatars, and items or functions acquired and retained by login users. The items or functions may be acquired or discarded in a virtual manner by users who log on. That is, their avatars or virtual animals (pets) may pick up desired items or functions from the roadside or may purchase them from shelves of virtual shops.

The AO server 23 can communicate with the CP server 22 using a predetermined application protocol. In other words, the CP server 22 and AO server 23 need not run on a single server machine; they may exist as independent computer systems in a scalable architecture as illustrated in FIG. 1.

Figure 4:
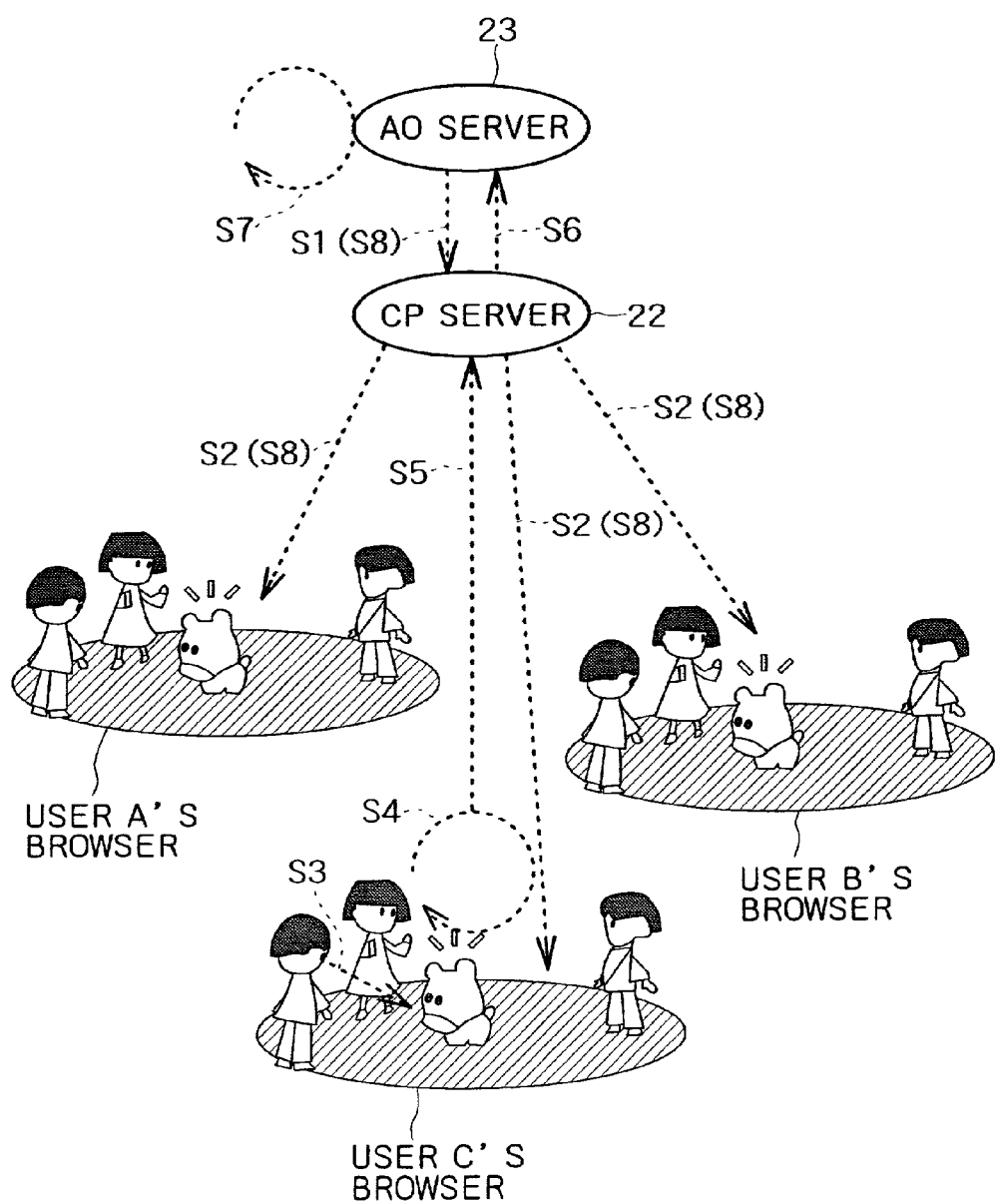
FIG. 4 is a schematic view of motion mechanisms of application objects (AO) according to the invention, showing what typically happens when a user logging on to shared virtual spaces clicks on his or her avatar representative of a pet (i.e., shared application)

FIG. 4 schematically shows motion mechanisms of application objects according to the invention. FIG. 4 depicts what typically happens when a user who has logged on to a shared virtual space clicks on a pet (shared application) of his or her avatar. In this example, clicking on the pet causes it to "bark," which is shared by all login users in the virtual space.

When the AO server 23 connects to the CP server 22, the AO server 23 requests the CP server 22 to add a shared object managed by the AO server 23 to the currently shared virtual space (step S1).

In turn, the CP server 22 transfers the request to all CP browsers connected to the server 22. As a result, the shared object appears on the monitor screens of all users currently logging on to the space (step S2). Information about the shared object fed to the CP browser of each login user may be limited to the aura (mentioned above) of the avatar in question or of its virtual pet.

If any one user selects (i.e., clicks on) a shared object on the CP browser screen (step S3), the corresponding script is started in the CP browser (step S4). The script sends a message to the CP server 22 in accordance with the VSCP protocol (step S5).

The CP server 22 forwards the message to the AO server 23 that manages the selected shared object (step S6). The AO server 23 processes the message and returns the same message to all other CP browsers via the CP server 22 (i.e., according to the VSCP protocol) (step S7). As a result, the message is transferred to the corresponding shared object on each CP browser screen and subjected to the same processing (step S8). Messages to be sent to each CP browser may be restricted alternatively as per the aura algorithm.

Although not shown in FIG. 4, similar processing takes place when an avatar or its virtual pet acquires or discards any item or function in the virtual space.

Illustratively, when a login user acquires or abandons an item on the CP browser screen, the corresponding script is started by the CP browser. The script sends a message to the CP server 22 in accordance with the VSCP protocol.

The CP server 22 forwards the message to the AO server 23 that manages the selected shared object. In turn, the AO server 23 processes the message and sends the same message to all CP browsers via the CP server 22 (i.e., in keeping with the VSCP protocol). As a result, the message is transferred to the corresponding shared object on each CP browser screen and subjected to the same processing. The message returned to each CP browser may be restricted alternatively in accordance with the aura algorithm.

1-3. Basic Operation Screen of the Community System

Figure 5:
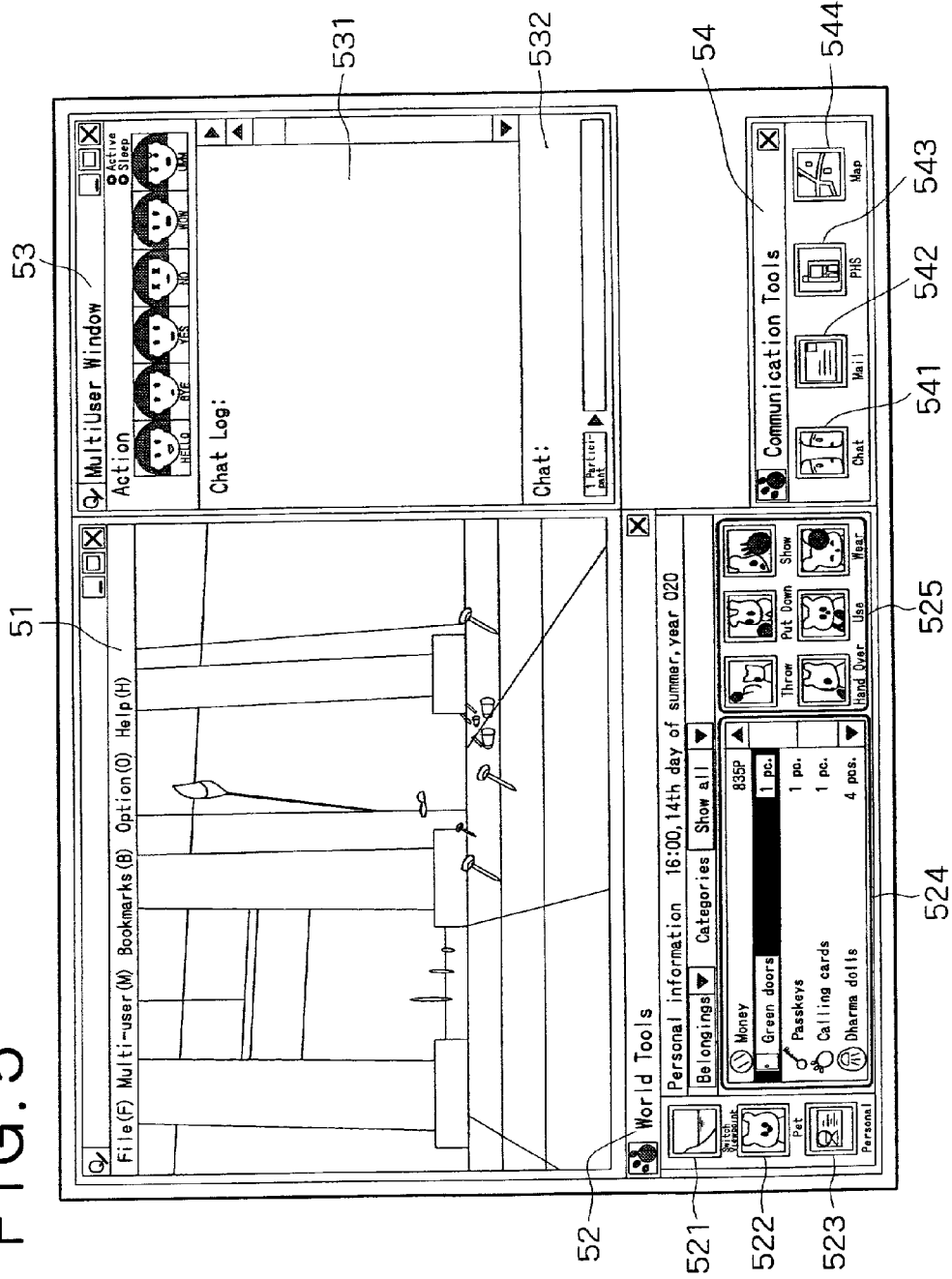
FIG. 5 is a schematic view of a basic operation screen appearing on a computer of a user logging on to a community system embodying the invention.

A basic operation screen displayed by the CP browser will now be described with reference to FIG. 5. As shown in FIG. 5, the basic operation screen illustratively comprises: a scene display area 51 that displays a scene as viewed by an avatar representing a user; a tool area 52 that displays information about avatars and pets; a communication tool area 54; and a communication display area 53 that displays a dialog regarding buttons set up in the communication tool area 54.

The tool area 52 includes: a switch-viewpoint button 521 for switching the viewpoint between two scenes, one viewed by the avatar and the other by the pet; a pet button 522 for displaying pet-related information (name, pattern, etc.); and a personal button 523 for displaying avatar-related information (e.g., about avatar's belongings).

The tool area 52 in FIG. 5 shows a screen illustratively giving personal information. The personal information screen includes two areas: a belongings display area 524 for displaying information about the avatar's belongings; and a button display area 525 showing buttons that may be operated to determine how the belongings are to be handled. The button display area 525 illustratively comprises: a throw button for throwing a selected item; a put-down button for putting down the selected item; a show button for showing the selected item; a hand-over button for handing over the selected item; a use button for using the selected item; and a wear button for wearing the selected item.

The communication tool area 54 includes: a chat button 541 for displaying a chat dialog in the communication display area 53; a mail button 542 operated to display a mail dialog for mail exchanges with other avatars; a PHS button 543 for calling up a specific party to have chat; and a map button 544 used to display the avatar's current location on a map.

The communication display area 53 in FIG. 5 shows a chat dialog that includes a dialog display area 531 and a dialog input field 532. The dialog display area 531 displays dialogs with other avatars and pets. The dialog input field 532 allows the user to enter statements for dialog with other avatars and pets.

2. Charge Management of the Community System

Charge management of the community system according to the invention will now be described.

2-1. Principles of charge management

The principles of charge management according to the invention are outlined below. The community system of this invention is intended basically to admit a sufficient number of users to establish a viable community. To achieve that end, the community system tolerates a sizable number of nonpaying users while charging willing customers fees that are necessary for the system to offer, sustain and improve its services.

Users are not charged when logging on to the community system; they are charged only when they decide to own specific "rooms" as privileged users in the virtual community.

Users' own "rooms" signify closed virtual spaces assigned to the individual users in a shared virtual space. With this embodiment of the invention, so-called avatars acting as incarnated alter egos of login users in the community system (shared 3D virtual space) are allowed to possess their own virtual rooms inside residences, castles and other virtual constructs in the community.

The concept of charging users for owning their specific virtual spaces works in the same way as in the real world. In the real world, people are charged for renting houses and rooms for living, compartments for karaoke get-togethers, halls or conference rooms for meetings, and so on. The charges are contingent on the size and functionality of the room or accommodation in question. For novices barely familiar with computers and networks, it is far easier to grasp the concept of paying for virtual spaces by analogy with the real world than to understand the arcane significance of the rent-a-disc service mentioned earlier.

Privileges granted to each user who owns a specifically assigned room include the ability to put down decorative items where desired in the room, to put up photos where preferred on the walls, and to determine whom to invite into the room by use of a password.

Because anyone who simply logs on to the community system is not charged, users can participate unhesitatingly in the community. This feature protects the community system from losing its participants precipitously when going optionally chargeable. With a sufficient number of users willing to log on to the system, a viable community can be maintained. From a different point of view, even nonpaying users contribute to perpetuating the community by simply taking part in it free of charge; the community can then attract new, paying users. In other words, nonpaying users are in fact paying their dues by their act of participating in the community. For that reason, it will be considered legitimate for nonpaying users to enjoy the benefit of logging on free of charge.

User-owned virtual spaces are not indispensable for effecting ordinary communication in the shared virtual space. The user-specific virtual space is of a privileged nature, rather than a standard possession of an avatar. For these reasons, few users will object to making user-specific virtual spaces chargeable.

2-2. Structure for Effecting Charge Management

A structure for effecting charge management of this invention will now be described. In the network computing system shown in FIG. 1, a charge server for managing charges on each user who logs on to the community system is attached to the LAN 20A which may be run illustratively by a service provider offering community system services. The charge server may be constituted by an independent host apparatus (not shown) or may be implemented on a host computer such as the AO server 23 or CP server 22 providing other server functions as well.

The charge server has a charge database that includes two tables: a room information management table for managing information about user-owned rooms, and a charge information table for managing fees defined for different types of rooms owned by users.

FIG. 6 is a schematic view of a typical room information management table 28. In the table 28, one record is created for each user who has purchased a room. As shown in FIG. 6, each record is made up of fields covering the following: a server number for identifying the CP server 22; a room number for identifying the room in question; an owner ID equivalent to the user ID of the user who purchased the room; a type of the room the user purchased; a name of the room purchased; and a watchword that serves as a password.

FIG. 7 is a schematic view of a typical charge information table 29. In the table 29, one record is created for each room type. As shown in FIG. 7, each record has fields covering a type of the room purchased by the user, and a monthly fee for the room.

Since each record in the room information management table 28 contains an owner ID and a type, a search through the charge information table 29 for the type as a key permits retrieval of charge information corresponding to the owner ID of interest.

Figure 8:
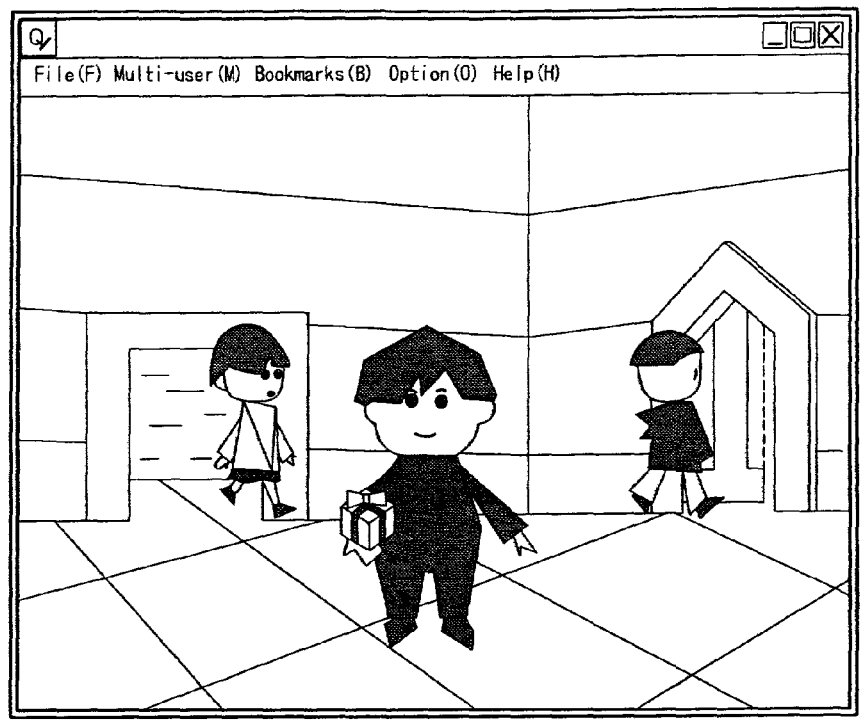
FIG. 8 is a schematic view of a room of one type.
Figure 9:
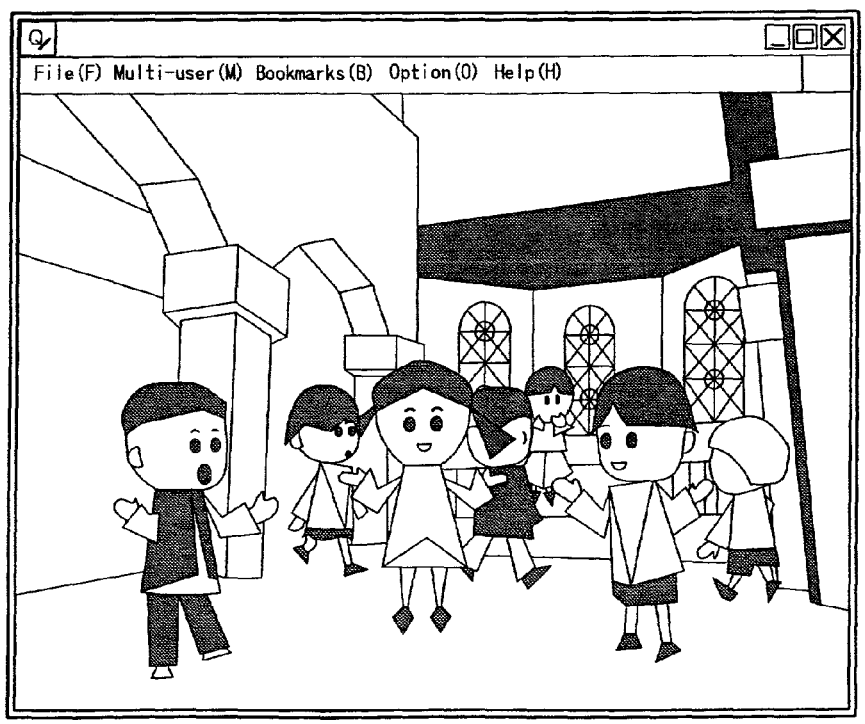
FIG. 9 is a schematic view of a room of another type.
Figure 10:
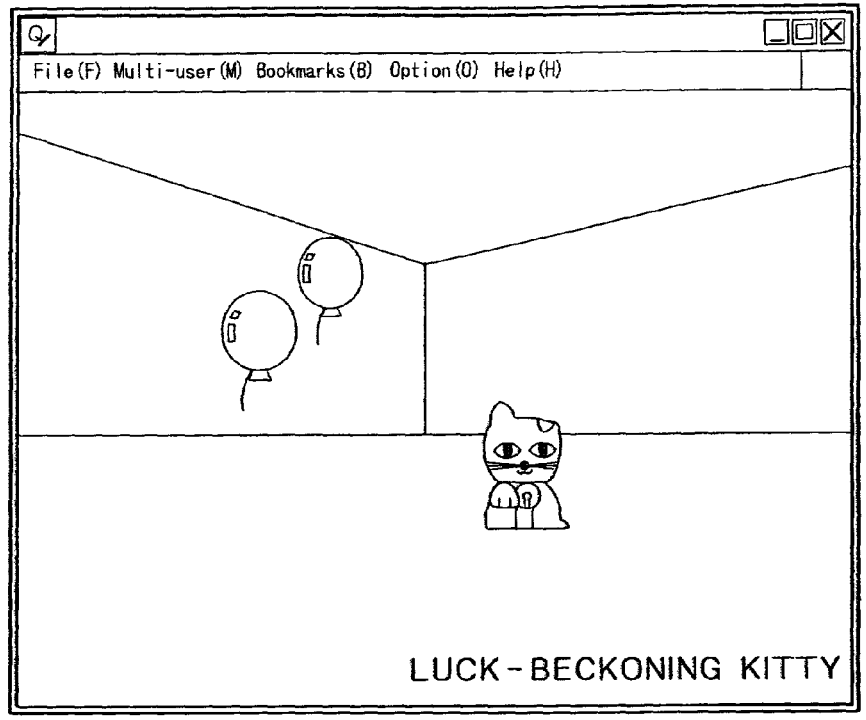
FIG. 10 is a schematic view of a room of still another type.
Figure 11:
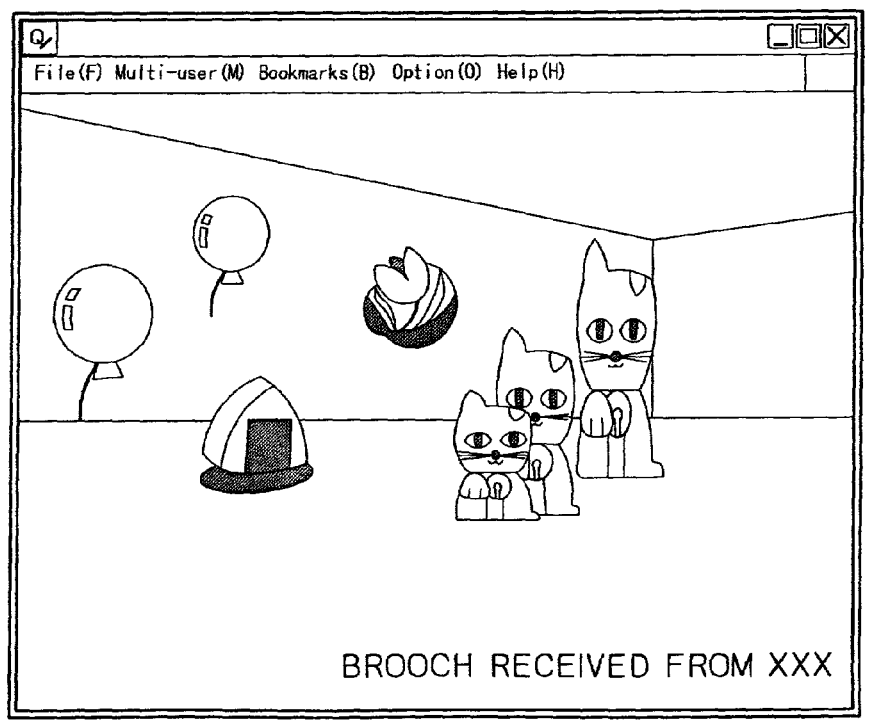
FIG. 11 is a schematic view of a room of yet another type.

User-specific virtual spaces will now be described in more detail by referring to FIGS. 8 through 11. FIG. 8 is a schematic view of a room designed to accommodate a limited number of visiting users; FIG. 9 shows a room allowed to accommodate a large number of visiting users; FIG. 10 depicts a room designed to be decorated with a limited number of items; and FIG. 11 illustrates a room allowed to be decorated with a large number of items.

The structure above makes it possible to set user fees depending on the size, function, design, etc., of each user-specific virtual space constituting a room. More specifically, a room that is small in size but has superior functions commands higher fees than others, and so does a room with modest functionality but with a magnificent design.

FIG. 12 shows a screen with typical monthly fee choices allowing a user to make necessary entries when purchasing a desired room. As shown in FIG. 12, the embodiment of this invention illustratively offers three room types: a room accommodating up to 50 people and a maximum of 50 decorative items; a room accommodating up to 30 people and a maximum of 30 decorative items; and a room accommodating up to 10 people and a maximum of 20 decorative items. Owners of these rooms are charged monthly fees of ¥2,000, ¥1,500 and ¥1,000 respectively.

The above-mentioned items illustratively include money, hats and ornaments owned by avatars representing login users or worn by the avatars' virtual pets in the 3D community system, i.e., in the shared 3D virtual space; as well as picture frames and other decorations that may be put up on the walls of virtual rooms. These items may be found on the shelves of virtual shops or on the roadside in the community system. Login users, if they wish, may acquire such items by getting their avatars or pets to buy them or pick them up. Users may be charged monthly not only for the number of items they have acquired but also for the types of the obtained items. This optional scheme is acceptable because users at their own choice can enjoy additional privileges depending on the types of their acquired items.

2-3. How Charge Management Works

Figure 13:
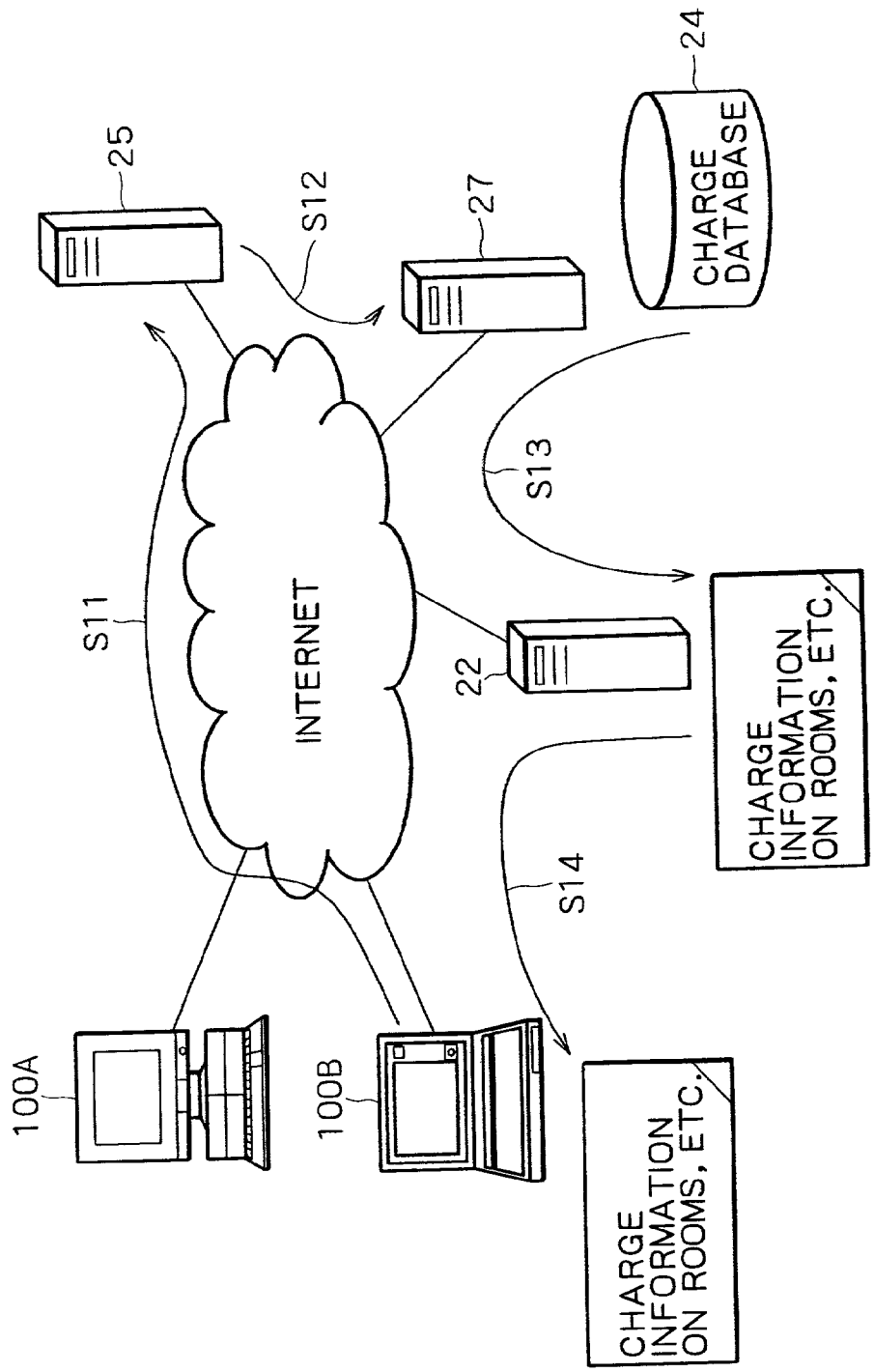
FIG. 13 is a schematic flow diagram showing steps for managing charge information about users.

The workings of charge management according to the invention will now be described. FIG. 13 is a schematic flow diagram showing steps for managing charge information about users. In this inventive setup, a client 100 operated by a user sends to the WWW server 25 room information entered by the user upon purchase of a room (step S11). The WWW server 25 forwards the received room information to a charge server 27. In turn, the charge server 27 stores the room information received into the room information management table 28 (step S12). The charge server 27 then sends charge information to the CP server 22 (step S13). Next time the user logs on to the community system, the client 100 acquires the charge information including details about the room purchase from the CP server 22 (step S14).

Figure 14:
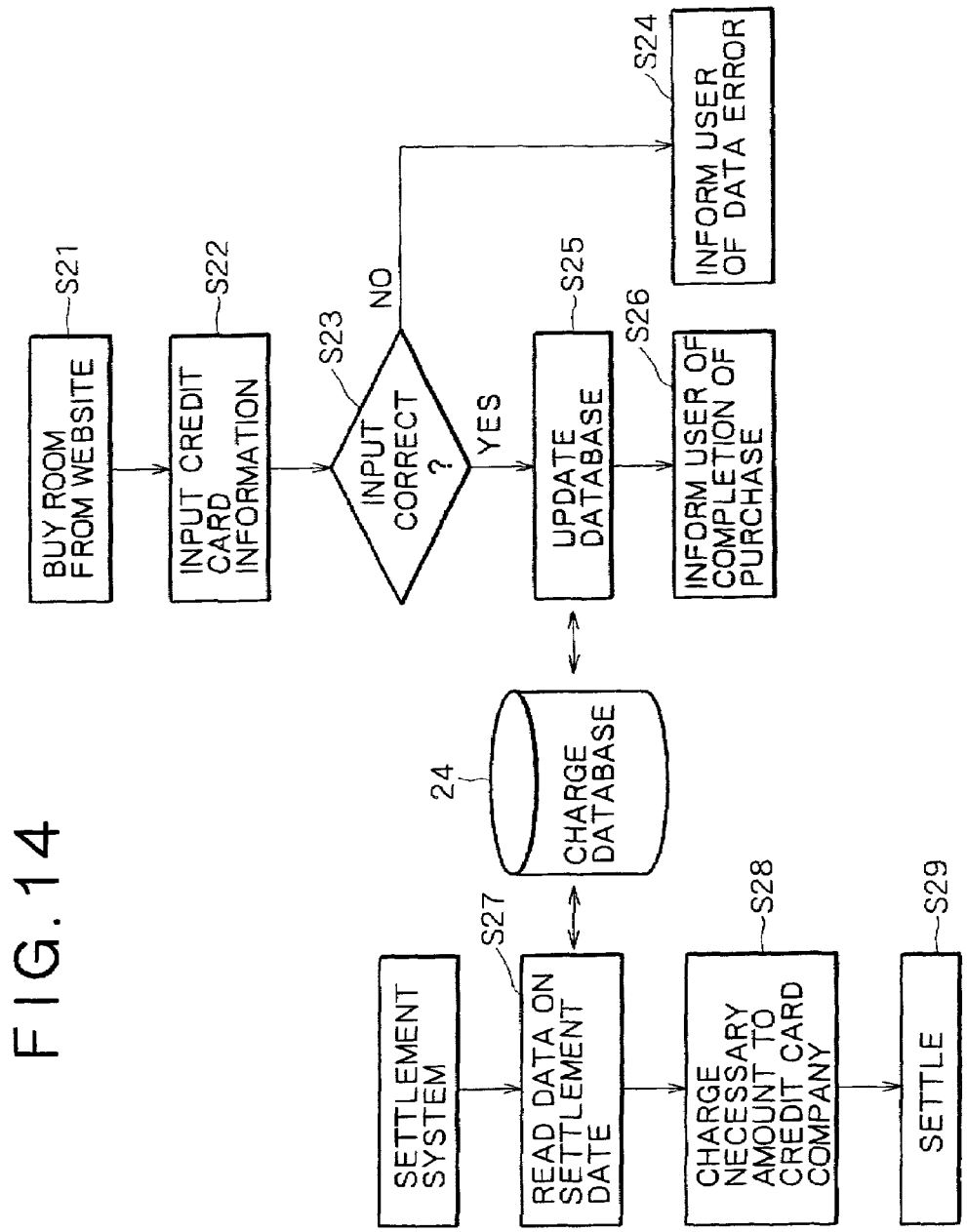
FIG. 14 is a flowchart of steps constituting a charging procedure ranging from a user's purchase of a room to the settlement of the room fee.

What follows is a more detailed description of charge-related processing in charge management. FIG. 14 is a flowchart of steps constituting a charging procedure ranging from a user's purchase of a room to the settlement of the room fee. The user first selects and buys a desired room through the input screen of FIG. 12 (step S21).

The user then inputs through his or her client 100 credit card information, including the credit card number and user name, which is necessary for the settlement of the purchased room (step S22).

The WWW server 25 receives from the client 100 the credit card information entered by the user, and checks to see if the information is valid (step S23).

If the credit card information is judged invalid in step S23, then the WWW server 25 sends to the user-operated client 100 a message saying that the data are invalid (step S24).

If the credit card information is judged valid in step S23, the WWW server 25 forwards to the charge server the room information and credit card information entered by the user, whereby a charge database 24 in the charge server is updated (step S25).

Next time the user logs on to the community system, the user is notified of the charge information including details about the room purchase (step S26).

In order to perform charge processing, the charge server searches the charge database 24 for charge data applicable to a settlement day falling on the day of charge processing, and reads the charge data (step S27).

Having read the charge data, the charge server creates charge data to be sent to the credit card company based on the credit card information included in the retrieved charge data as well as on the room fee found in the charge information table 29. The charge data thus created are sent to a host computer owned by the credit card company (step S28).

Upon receipt of the charge data, the host computer of the credit card company collects the fee from the user's account at a designated financial institution in accordance with the charge data (step S29).

2-4. Login Operation After Room Purchase

How a user logs on to the community system after purchase of a room will now be described with reference to FIG. 15. On a community system menu screen displayed by the CP browser, the user first selects a PCG (personal casting gallery), i.e., a menu item for gaining access to a lobby that serves as an entrance to the user's own room, and clicks on an OK button (step S31). If any one of the other menu items SPACE1 through SPACE3 is selected, the user may gain access through the CP server 22 to a shared virtual space which corresponds to the selected menu item (step S32).

The CP browser then displays a login screen permitting access to the lobby constituting the entrance to the user-specific room. The user inputs a user ID and a password to the user ID field and password field on the login screen, and clicks on the OK button (step S33).

Given the user ID and password from the CP browser, the CP server 22 checks to see if the password is correct in conjunction with the user ID (step S34).

If in step S34 the password is judged incorrect, then step S33 is reached.

If in step S34 the password is judged correct, the CP server 22 references the charge database 24 in the charge server to determine whether the login user owns a room (step S35).

Figure 15:
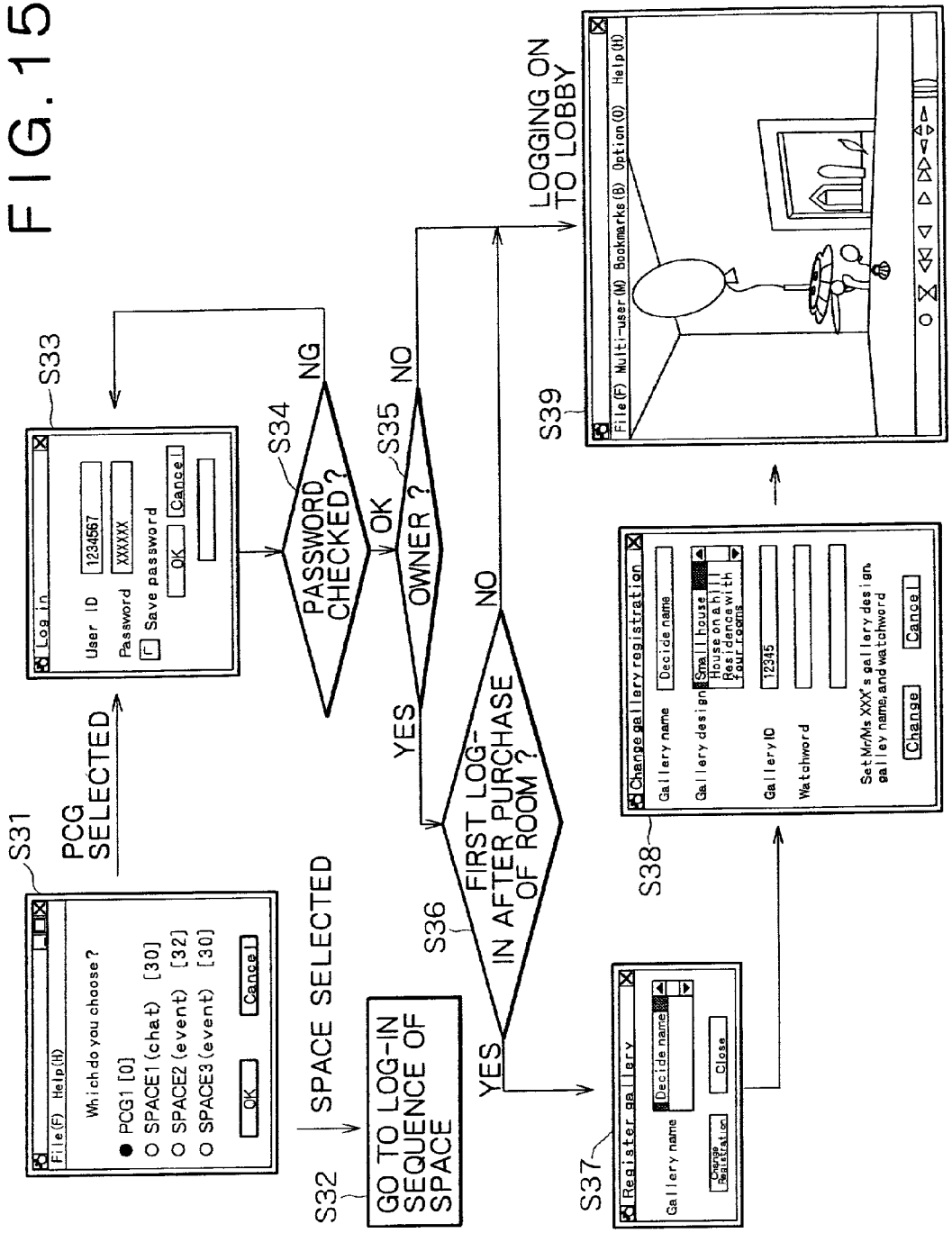
FIG. 15 is a flowchart of steps in which a user, after buying a room in a community system, logs on to the system.

If in step S35 the login user is not judged to own a room, the CP browser displays the lobby shown in FIG. 15 (step S39). This lobby displayed in step S39 is a virtual space that serves as the entrance to each user's own room.

If in step S35 the login user is judged to own a room, the CP server 22 determines whether the login user has already logged on after the purchase of the room (step S36).

If in step S36 the login user is judged to have already logged on following the purchase of the room, the CP browser displays the lobby that is the entrance to the user's own room (step S39).

If it is judged in step S36 that the user is trying to log on for the first time after the purchase of the room, the CP server 22 causes the CP browser to display a gallery registration screen through which to register information about the room purchased by the user (step S37).

The user selects a desired name for a gallery (i.e., room) purchased this time from a gallery name list on the gallery registration screen displayed by the CP browser (the "Gallery name" field has an indication "Decide name" before selection of a name) Clicking on a "Change Registration" button causes a gallery registration change screen to appear (step S38).

The user then enters necessary data into a gallery type field (residence, church, etc.) and a watchword field (password) which admit the input items on the gallery registration change screen, and clicks on a "Change" button. This causes the CP browser to display the lobby that is the entrance to the user's own room (step S39).

2-5. Moving into the Purchased Room after Login

Figure 16:
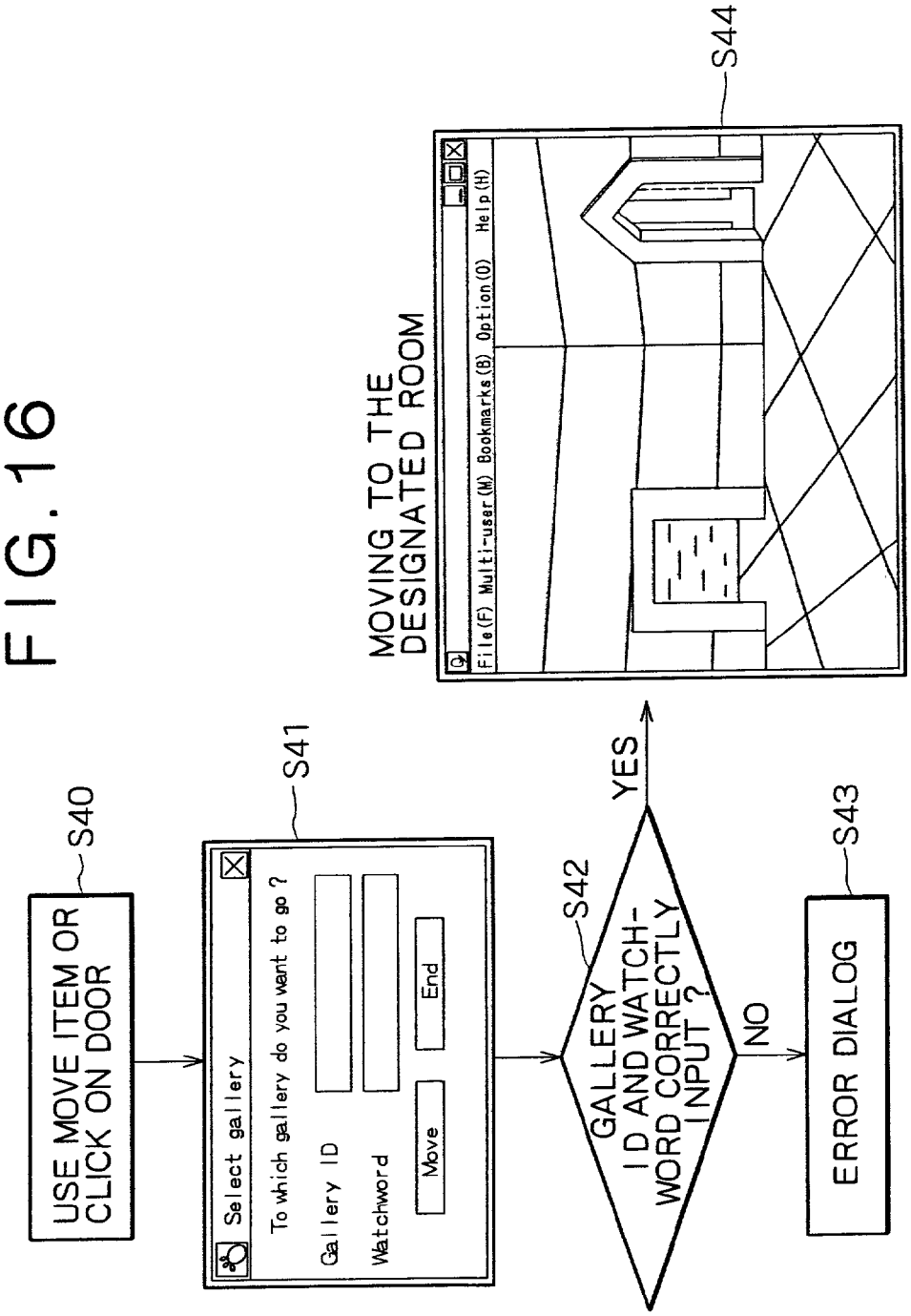
FIG. 16 is a flowchart of steps in which a user moves into a room.

How a user moves into a room will now be described with reference to FIG. 16. On the basic operation screen (see FIG. 5) displayed by the CP browser, the user first knocks on a door displayed in the scene display area 51. Alternatively, the user selects a "green door" (an item used to move into a room) displayed in the belongings display area 524 on the basic operation screen, and clicks on a "Use" button in the button display area 525 (step S40). This causes the CP browser to display a gallery selection screen (step S41).

The user enters a gallery ID and a watchword of the target gallery into a gallery ID field (for a room number) and a watchword field (for a password) on the gallery selection screen respectively, and clicks on a "Move" button. This causes the CP server 22 to reference the charge database in the charge server to see if the gallery ID and watchword have been input correctly (step S42).

If in step S42 the gallery ID and watchword are judged incorrect, the CP browser displays an error message (step S43).

If in step S42 the gallery ID and watchword are judged to be input correctly, the CP browser displays the target room designated by the user (step S44).

2-6. Operation for Decorating with Items

Described below with reference to FIGS. 17 through 22 is how a user attaches or removes balloons (i.e., items) to or from the purchased room. First to be described is how to decorate the room, shown in the scene display area 51 of the basic operation screen in FIG. 17, with balloons. The user selects a "Balloons" item from among the belongings indicated in the belongings display area 524 in FIG. 17, and clicks on a "Throw" button in the button display area 525.

Figure 17:
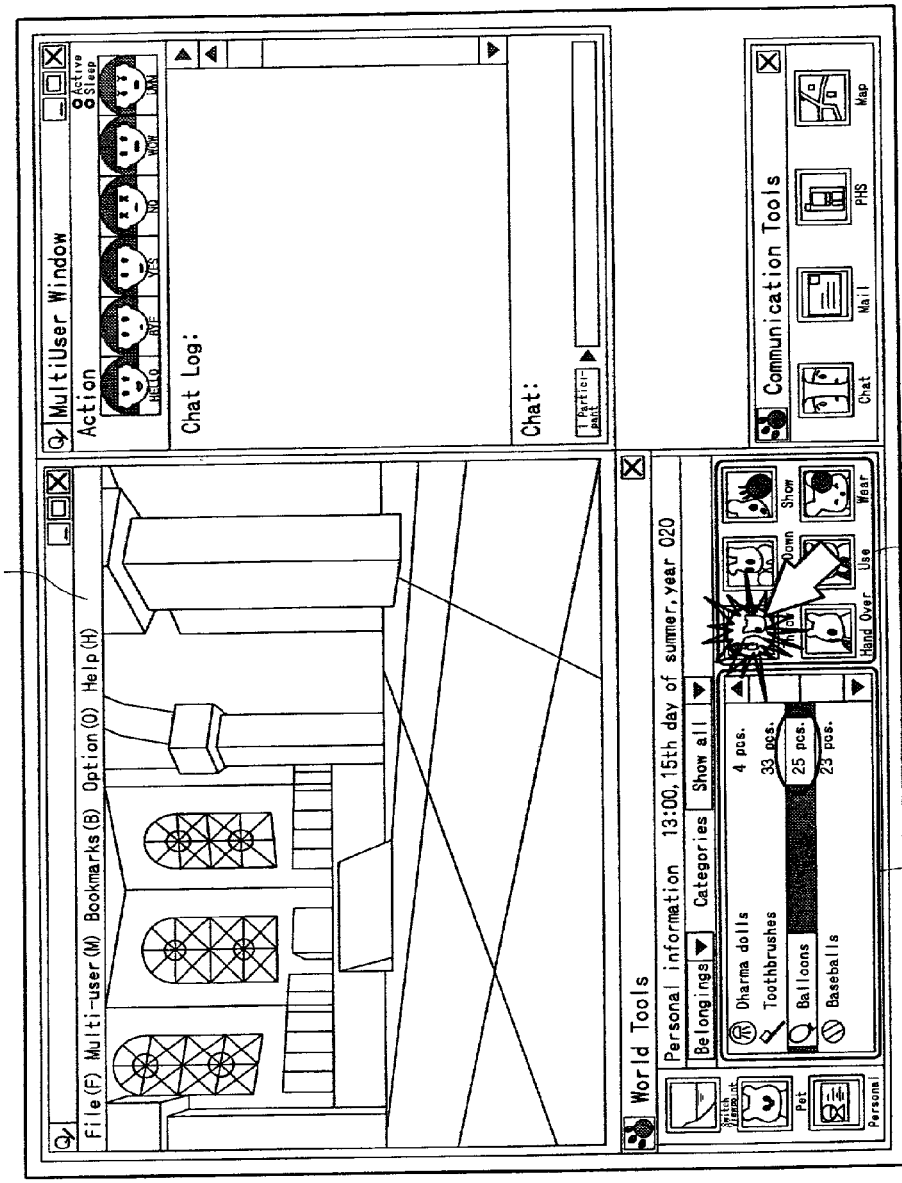
FIG. 17 is a schematic view of screens for allowing a user who bought a room to decorate it with items.
Figure 18:
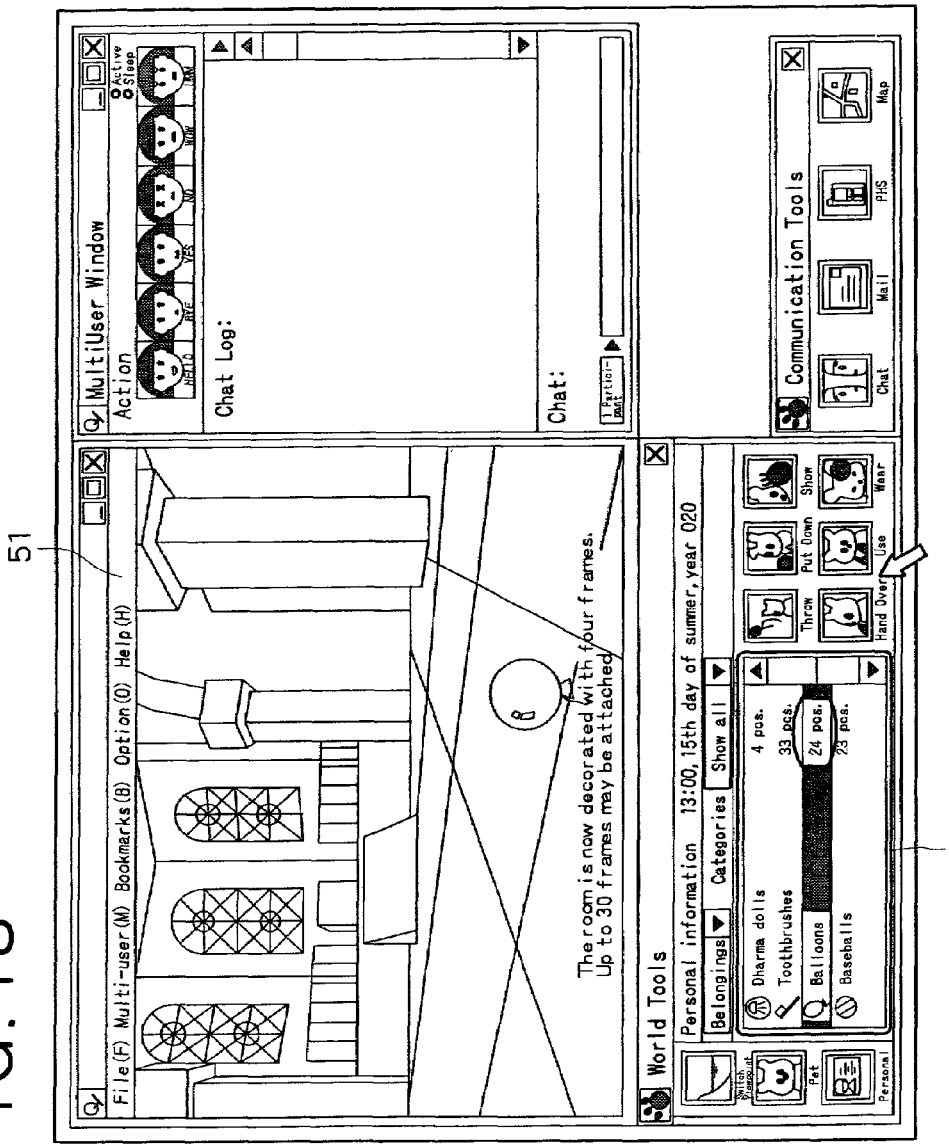
FIG. 18 is a schematic view of screens showing how a room purchased by a user is typically decorated with items.

Clicking the "Throw" button on the basic operation screen in FIG. 17 causes another basic operation screen to appear as shown in FIG. 18. A balloon is displayed in the scene display area 51 on the basic operation screen in FIG. 18. The balloon count highlighted in the belongings display area 524 is seen decremented from 25 to 24. Clicking the balloon in the scene display area 51, as shown on the basic operation screen in FIG. 19, causes an item operation screen 191 to appear.

Figure 20:
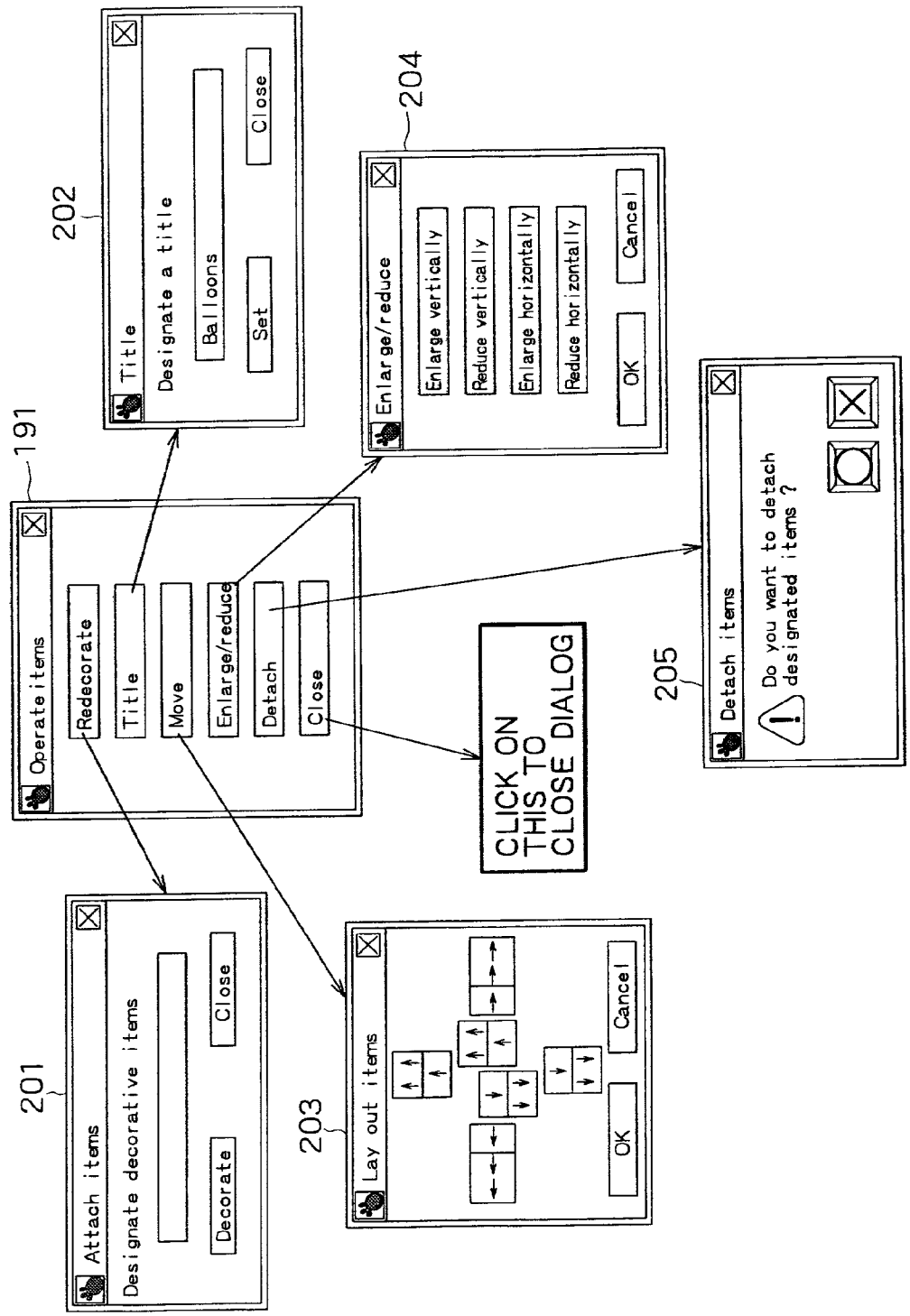
FIG. 20 is a schematic view of screens for operating items.

The functions of the buttons on the item operation screen 191 are explained here with reference to FIG. 20. Clicking a "Redecorate" button on the item operation screen 191 displays an item attaching screen 201. The screen 201 is used to enter the name of a new item that replaces the item clicked on in the scene display area 51.

Clicking a "Title" button on the item operation screen 191 causes a title screen 202 to appear. The title screen 202 is used to enter the name of a new title that replaces the current title of the item clicked in the scene display area 51.

Clicking a "Move" button on the item operation screen 191 causes an item layout screen 203 to appear. The item layout screen 203 is used to determine a new location of the item whose current location clicked in the scene display area 51 is to be changed.

Clicking an "Enlarge/reduce" button on the item operation screen 191 causes an enlarging/reducing screen 204 to appear. The screen 204 is used to determine a new size that replaces the current size of the item clicked in the scene display area 51.

Clicking a "Detach" button on the item operation screen 191 causes an item detaching screen 205 to appear. The screen 205 is used to remove from the room the item clicked in the scene display area 51.

Clicking a "Close" button on the item operation screen 191 closes the screen 191.

Figure 19:
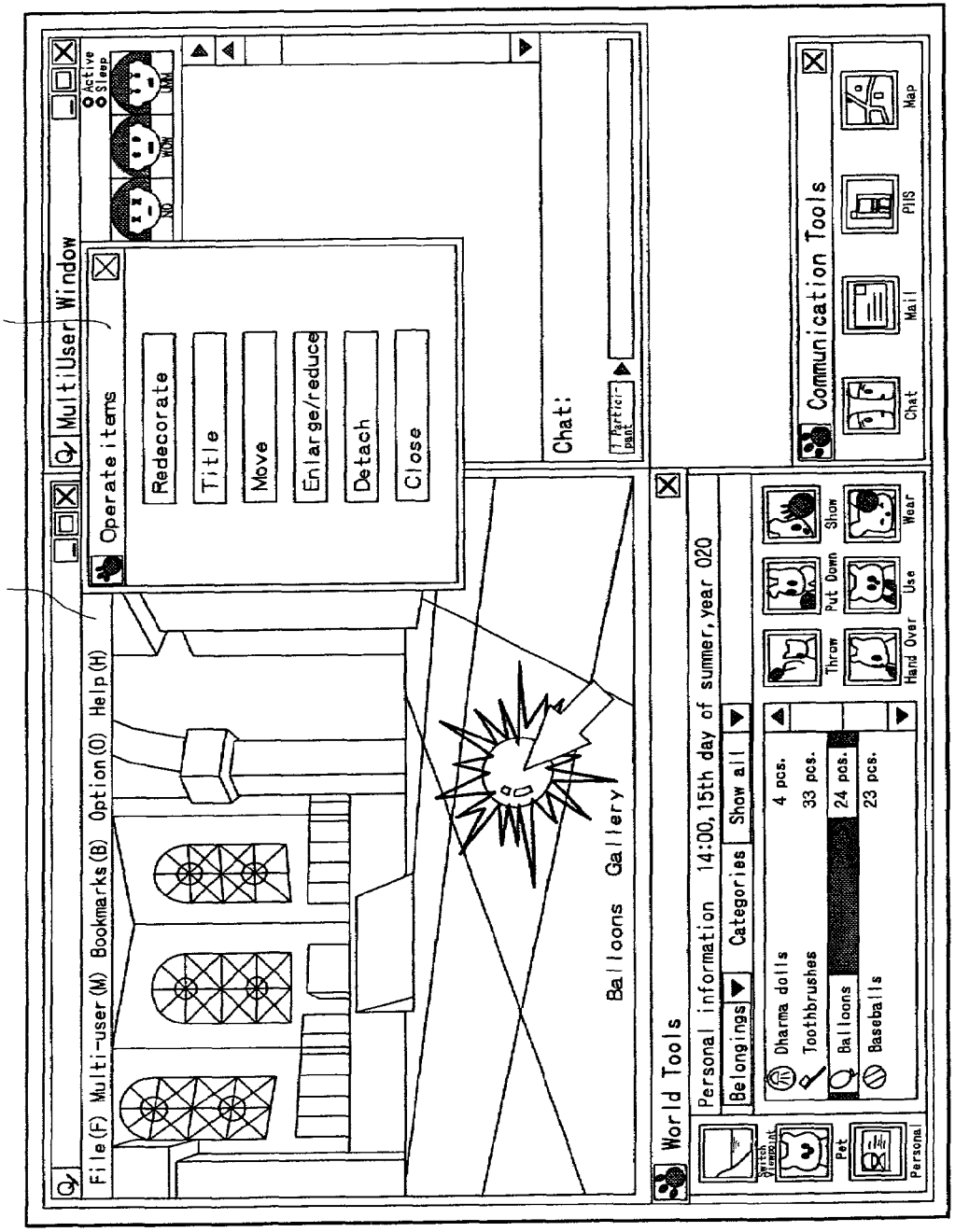
FIG. 19 is a schematic view of screens for allowing a user to operate items with which a room is decorated.
Figure 21:
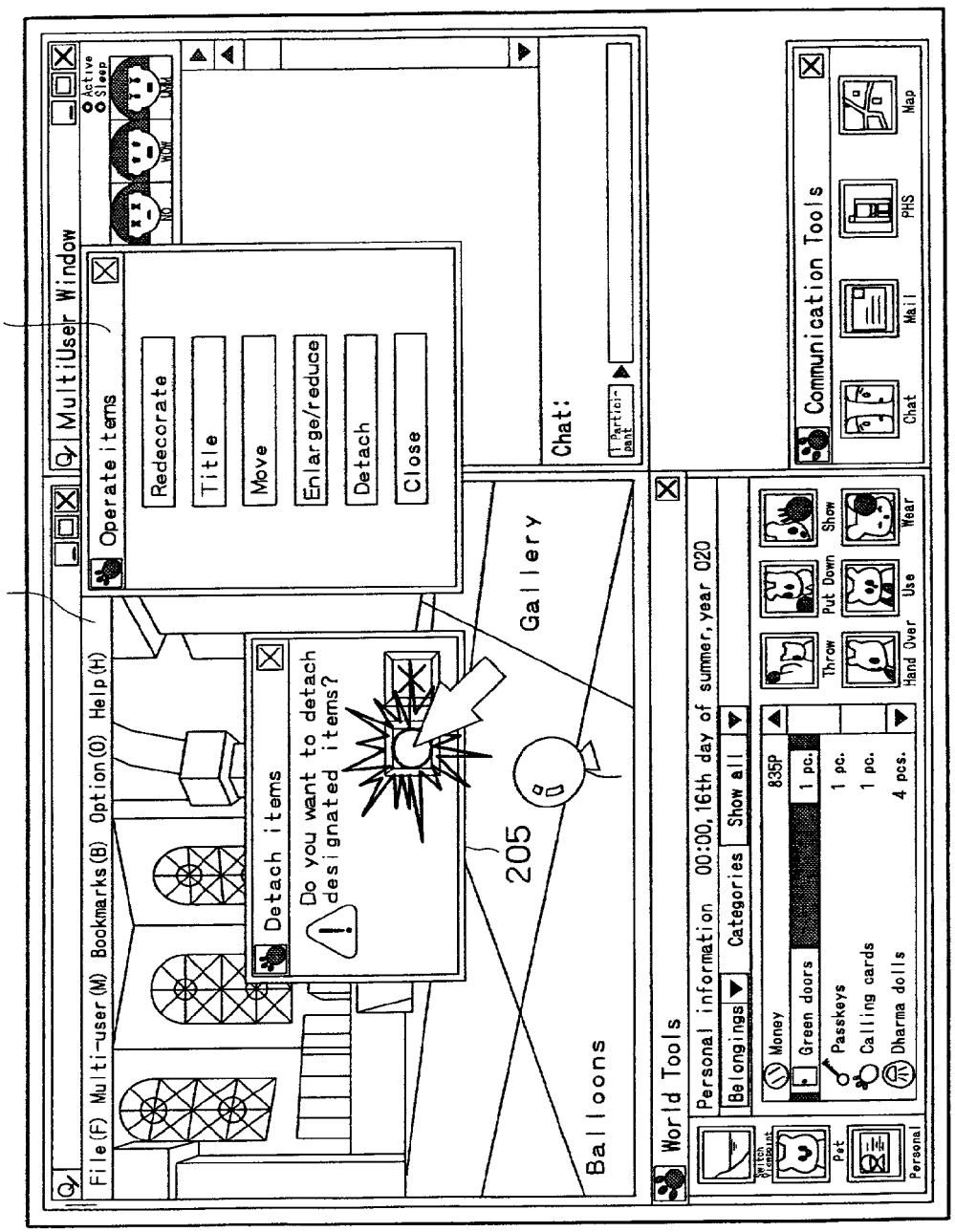
FIG. 21 is a schematic view of screens for allowing a user to detach decorative items from his or her room.
Figure 22:
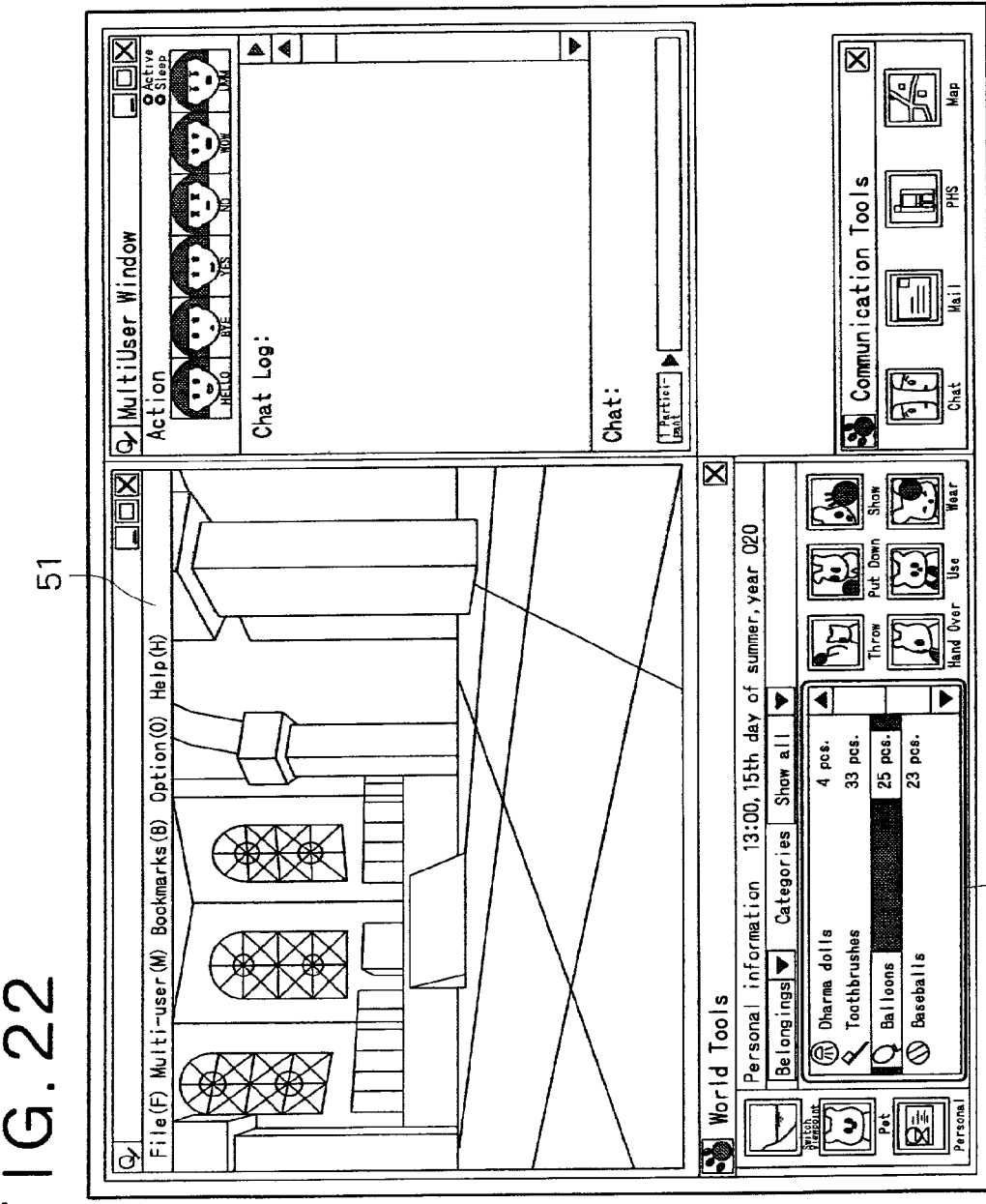
FIG. 22 is a schematic view of screens showing a user's room with its decorative items removed.

Illustratively, clicking the "Detach" button on the item operation screen in FIG. 19 causes the item detaching screen 205 to appear as shown in FIG. 21. Then clicking a "circle" button on the screen 205 displays another basic operation screen shown in FIG. 22. It can be seen that the balloon is now removed from the scene display area 51 of the basic operation screen in FIG. 22, with the highlighted balloon count changed from 24 to 25 in the belongings display area 524.

Information about the items attached to or detached from rooms for decorative purposes is managed by use of an item management database. The item management database will now be described with reference to FIG. 23.

In the item management database, one record is created for each item attached to a room for decoration. As shown in FIG. 23, each record is made up of fields covering the following: a server number for identifying a CP server; a room number for identifying the room purchased by the user; a frame number of a frame to which to attach image data; a name of the decorative item attached; a type of the attached item; a URL indicating where the image data attached to the frame are located; an item ID for identifying the attached item; a location of the attached item in virtual space; a scale of the attached item; and a degree of rotation of the attached item.

3. Variations 3-1. First Variation

With the embodiment discussed above, programs for implementing the community system are installed in advance on hard discs of the CP server 22, WWW server 25, or user PCs 100. Alternatively, the programs for implementing the community system may be installed upon use into computers for execution, carried by suitable program storage media such as package media including CD-ROMs (compact disc-read only memories) and DVD-ROMs (digital versatile disc-read only memories); or semiconductor memories, magneto-optical disks or the like where the programs are stored temporarily or permanently.

These program storage media may accommodate the programs that have been delivered through wired or wireless communication media such as local area networks and digital satellite broadcasting networks, as well as through diverse communication interfaces such as routers and modems.

3-2. Second Variations

With the above-described embodiment of this invention, users taking part in the community system were shown operating the user PCs 100. Alternatively, the user may utilize a portable telephone or a portable data terminal for gaining access to the community system.

Below is a description of how such portable telephones and portable data terminals may be used in place of the user PCs 100. In FIG. 24, a network computing system 200 is connected to portable data terminals MS1, MS2, etc., and to portable telephones MS3, MS4, etc., according to the invention. The network computing system 200 comprises base stations CS1 through CS4, i.e., fixed wireless stations each covering one of the cells constituting a communication service area.

The base stations CS1 through CS4 are connected wirelessly to the portable data terminals MS1, MS2, etc., and to potable telephones MS3, MS4, etc., which are a mobile wireless station each. The wireless connections are established illustratively on a W-CDMA basis (Wideband-Code Division Multiple Access). The W-CDMA scheme utilizes a 2-GHz frequency band permitting highspeed transmission of massive data at data transfer rates of up to 2 Mbps.

As described, the portable data terminals MS1, MS2, etc., and potable telephones MS3, MS4, etc., are designed to transmit large quantities of data at high speed by the W-CDMA method. This portable terminal setup permits execution not only of voice communications but also of diverse kinds of data communications, including exchanges of e-mails, browsing of websites in simple format, and sending and receiving of images.

The base stations CS1 through CS4 are wired to a telephone network 104. The telephone network 104 is in turn connected to the Internet 10, to numerous wired subscriber terminals (not shown), to computer networks, and to intracorporate local area networks.

In the network computing system 200, as with the above-described embodiment of the invention, the Internet 10 is connected to the LAN 20A or the like made up of the CP server 22, WWW server 25 and other components. These connections allow the portable data terminals MS1, MS2, etc., and potable telephones MS3, MS4, etc., to gain access to the CP server 22 and WWW server 25 in accordance with TCP/IP (Transmission Control Protocol/Internet Protocol).

In operation, the portable data terminals MS1, MS2, etc., and potable telephones MS3, MS4, etc., exchange data with the base stations CS1 through CS4 in keeping with a 2-Mbps simple transport protocol, and communicate with the CP server 22 and WWW server 25 via the base stations CS1 through CS4 and over the Internet 10 in accordance with TCP/IP.

As described, the invention provides a viable automatic charging technique by which users are charged selectively for virtually offered services over a network such as the Internet.

Community type services such as chat rooms, virtual conferences and the like practiced between a plurality of login users are known to be created and offered over the computer network such as the Internet. In such cases, the invention provides a viable automatic charging technique adapted to charge the login users suitably for the services they opt to enjoy.

Community type services such as chat rooms, virtual conferences and the like practiced between a plurality of login users are also known to be created and offered under different circumstances. In such cases, too, the invention provides an automatic charging technique adapted to charge the login users suitably for the way they make use of the offered services.

The invention provides an automatic charging technique allowing a virtual community to attract a large number of both paying and nonpaying users to sustain activities in the community, the paying users enjoying extra services for which they are charged.

Furthermore, the invention provides a community system which, in order to retain a sufficient number of users to establish a viable community, tolerates a sizable number of nonpaying users while charging willing customers fees that are necessary for the system to offer, sustain and improve its services. As such, the inventive system is acceptable to both the paying and nonpaying users.

Because anyone who simply logs on to the community system is not charged according to the invention, users can participate unhesitatingly in the community. The community is thus sustained structurally by the numerous users who stay with it.

When the inventive automatic charging method is in use, it is easier for ordinary users barely familiar with computers and networks to grasp and accept the concept of paying for virtually offered services. This method protects the community system from losing its participants precipitously when going optionally chargeable.

As many apparently different embodiments of this invention may be made without departing from the spirit and scope thereof, it is to be understood that the invention is not limited to the specific embodiments thereof except as defined in the appended claims.

What is claimed is:

1. A community service offering apparatus for exchanging information with a plurality of user terminals connected by a network, the apparatus comprising:

virtual space information storing means for storing, in advance, virtual space information specifying a plurality of types of virtual spaces to be offered for purchase, the virtual spaces configured to enable interaction between avatars, the types of virtual spaces being determined based on respective characteristics of the virtual spaces different from an amount of resources of the community service offering apparatus that is utilized by each respective virtual space, the respective characteristics including functionality of the virtual space;

virtual space offering means for allowing a first user of a plurality of users to select one of said virtual spaces as a user-specific virtual space leased or owned by said first user of the plurality of users, each user corresponding to at least one avatar; and charge controlling means for charging said first user of the plurality of users a fee to own or lease said user-specific virtual space, wherein said fee is based on the specified type of said user-specific virtual space which is determined based on respective characteristics of the virtual space which includes the functionality of the virtual space and only said first user of the plurality of users is charged to own or lease said user-specific virtual space and the remaining plurality of users may access the virtual space without charge.

2. A community service offering apparatus according to claim 1, wherein said virtual space information specifies a maximum number of further users who can gain access simultaneously to said user-specific virtual space, and said charge controlling means charges said first user a fee based on the specified maximum number of further users who can gain access simultaneously to said user-specific virtual space.

3. A community service offering apparatus according to claim 1, wherein said charge controlling means charges said first user a fee in proportion to the amount of data constituting a real storage area allocated to said user-specific virtual space.

4. A community service offering apparatus according to claim 1, wherein said virtual space information specifies a maximum number of non-avatar objects that can be allocated to said user-specific virtual space, and said charge controlling means charges said first user a fee based on the specified maximum number of non-avatar objects that can be allocated to said user-specific virtual space.

5. A community service offering apparatus according to claim 1, further comprising:

access managing means for managing access to said user-specific virtual space, wherein, if users other than said first user attempt to gain access to said user-specific virtual space, then said access managing means determines whether to permit said access based on a virtual space identification code for identifying said user-specific virtual space and on a password, both said virtual space identification code and said password being input by the access-attempting users.

6. A community service offering apparatus according to claim 1, further comprising:
object managing means for managing objects located where desired in said user-specific virtual space.

7. A community service offering apparatus according to claim 6, wherein said object managing means manages objects located as designated by those users other than said first user who gain access to said user-specific virtual space.

8. A community system for allowing a community service offering apparatus to exchange information with a plurality of user terminals connected by a network,
wherein:
said community service offering apparatus comprises
virtual space information storing means for storing, in advance, information specifying a plurality of types of virtual spaces to be offered for purchase, the virtual spaces configured to enable interaction between avatars, the types of virtual spaces being determined based on respective characteristics of the virtual spaces different from an amount of resources of the community service offering apparatus that is utilized by each respective virtual space, the respective characteristics including functionality of the virtual space;
virtual space offering means for allowing a first user of a plurality of users to select one of said virtual spaces as a user-specific virtual space leased or owned by said first user of the plurality of users, each user corresponding to at least one avatar,
charge controlling means for charging said first user of the plurality of users a fee to own or lease said user-specific virtual space, wherein said fee is based on the specified type of said user-specific virtual space which is determined based on respective characteristics of the virtual space which includes the functionality of the virtual space and only said first user of the plurality of users is charged to own or lease said user-specific virtual space and the remaining plurality of users may access the user-specific virtual space without charge; and
each of said user terminals comprises displaying means for displaying said user-specific virtual space.

9. A community service offering apparatus according to claim 1, wherein
said virtual space information specifies limited types of non-avatar objects that can be allocated to said user-specific virtual space, and
said charge controlling means charges a privileged user a fee in accordance with the specified limited types of said non-avatar objects that can be allocated to said user-specific virtual space.

10. A computer readable carrier including program instructions that cause a computer to implement a method of exchanging information with a plurality of user terminals connected by a network, the method comprising:
storing, in advance, virtual space information specifying a plurality of types of virtual spaces to be offered for purchase, the virtual spaces configured to enable interaction between avatars, the types of virtual spaces being determined based on respective characteristics of the virtual spaces different from an amount of resources of the community service offering apparatus that is utilized by each respective virtual space, the respective characteristics including functionality of the virtual space;

allowing a first user of a plurality of users to select one of said virtual spaces as a user-specific virtual space leased or owned by said first user of the plurality of users, each user corresponding to at least one avatar; and
charging said first user of the plurality of users a fee to own or lease said user-specific virtual space, wherein said fee is based on the specified type of said user-specific virtual space which is determined based on respective characteristics of the virtual space which includes the functionality of the virtual space and only said first user of the plurality of users is charged to own or lease said user-specific virtual space and the remaining plurality of users may access the user-specific virtual space without charge.

11. A community service offering apparatus comprising:
virtual world space information storing means for storing, in advance, virtual world space information specifying a plurality of types of virtual spaces in a virtual world to be offered for purchase, the virtual spaces configured to enable interaction between avatars, the types of virtual spaces being determined based on respective characteristics of the virtual spaces different from an amount of resources of the community service offering apparatus that is utilized by each respective virtual space, the respective characteristics including functionality of the virtual space;
virtual world space offering means for allowing a purchasing user of a plurality of users of the virtual world to select one of said virtual spaces in the virtual world as a user-specific virtual space in the virtual world leased or owned by said purchasing user of the plurality of users of the virtual world, each user corresponding to at least one avatar; and
charge controlling means for charging said purchasing user of the plurality of users of the virtual world a fee to own or lease said user-specific virtual space in the virtual world, said fee being based on the specified type of said user-specific virtual space which is determined based on respective characteristics of the virtual space which includes the functionality of the virtual space,
wherein only said purchasing user of the plurality of users of the virtual world is charged to own or lease said user-specific virtual space in the virtual world and the remaining plurality of users of the virtual world may access the virtual space in the virtual world without charge.

12. The community service offering apparatus according to claim 11, wherein the fee to own or lease said user-specific virtual space in the virtual world is a monthly fee.

13. The community service offering apparatus according to claim 12, wherein the fee to own or lease said user-specific virtual space in the virtual world includes a virtual space use fee, the virtual space use fee based on the amount of virtual space owned or leased by said purchasing user in the virtual world.

14. The community service offering apparatus according to claim 11, wherein said fee is based on the specified type of said user-specific virtual space.

15. The community service offering apparatus according to claim 1, wherein the fee to own or lease said user-specific virtual space is a monthly fee.

16. The community service offering apparatus according to claim 1, wherein the fee to own or lease said user-specific virtual space includes a virtual space use fee, the virtual space use fee based on the amount of virtual space owned or leased by said first user in the virtual world.

* * * * *